(12) United States Patent
Fujisawa et al.

(10) Patent No.: US 8,098,328 B2
(45) Date of Patent: Jan. 17, 2012

(54) IMAGE SIGNAL PROCESSING APPARATUS, IMAGE DISPLAY AND IMAGE DISPLAY METHOD

(75) Inventors: Tomoichi Fujisawa, Kanagawa (JP); Shinichiro Miyazaki, Kanagawa (JP)

(73) Assignee: Sony Corporation (JP)

( * ) Notice: Subject to any disclaimer, the term of this patent is extended or adjusted under 35 U.S.C. 154(b) by 1259 days.

(21) Appl. No.: 11/810,962

(22) Filed: Jun. 6, 2007

(65) Prior Publication Data
US 2008/0007655 A1    Jan. 10, 2008

(30) Foreign Application Priority Data
Jun. 8, 2006    (JP) ................ P2006-159316

(51) Int. Cl.
*H04N 5/46* (2006.01)
*H04N 5/14* (2006.01)
*H04N 9/64* (2006.01)

(52) U.S. Cl. .............. 348/558; 348/556; 348/571
(58) Field of Classification Search .......... 348/556, 348/558
See application file for complete search history.

(56) References Cited

U.S. PATENT DOCUMENTS

| | | | | |
|---|---|---|---|---|
| 5,686,970 A * | 11/1997 | Tani et al. | | 348/558 |
| 5,699,123 A * | 12/1997 | Ebihara et al. | | 348/445 |
| 5,748,257 A | 5/1998 | Kawabata et al. | | |
| 5,760,840 A * | 6/1998 | Tani et al. | | 348/558 |
| 5,808,697 A * | 9/1998 | Fujimura et al. | | 348/672 |
| 5,956,092 A * | 9/1999 | Ebihara et al. | | 348/445 |
| 6,002,797 A * | 12/1999 | Mori et al. | | 382/173 |
| 6,163,621 A * | 12/2000 | Paik et al. | | 382/169 |
| 6,208,385 B1 * | 3/2001 | Konishi et al. | | 348/558 |
| 6,262,772 B1 * | 7/2001 | Shen et al. | | 348/445 |
| 6,340,992 B1 * | 1/2002 | Markandey | | 348/556 |
| 6,366,706 B1 * | 4/2002 | Weitbruch | | 382/254 |
| 6,463,102 B1 * | 10/2002 | Linzer | | 375/240.29 |
| 6,519,006 B1 * | 2/2003 | Nakamura et al. | | 348/445 |
| 6,621,927 B1 * | 9/2003 | Mori et al. | | 382/173 |
| 6,747,671 B1 * | 6/2004 | Saito | | 345/698 |
| 6,947,097 B1 * | 9/2005 | Joanblanq | | 348/558 |
| 7,046,302 B2 * | 5/2006 | Konuma | | 348/558 |
| 7,061,552 B1 * | 6/2006 | Patten et al. | | 348/806 |
| 7,129,992 B2 * | 10/2006 | Barnichon | | 348/556 |

(Continued)

FOREIGN PATENT DOCUMENTS

JP    05-027736 A    2/1993

(Continued)

OTHER PUBLICATIONS

Office Action from Japanese Application No. 2006-159316, dated May 10, 2011.

*Primary Examiner* — Brian Yenke
(74) *Attorney, Agent, or Firm* — Lerner, David, Littenberg, Krumholz & Mentlik, LLP

(57) ABSTRACT

An image signal processing apparatus capable of detecting a black band region included in an input image signal in a shorter time is provided. The image signal processing apparatus may include a measuring means for measuring in a unit frame period whether each pixel in a designated measurement region of an input image signal has a signal level less than a threshold value; and a black band detecting means for detecting a black band region included in the input image signal on the basis of a measurement result from the measuring means.

18 Claims, 28 Drawing Sheets

U.S. PATENT DOCUMENTS

| | | | |
|---|---|---|---|
| 7,187,415 B2 * | 3/2007 | Arora | 348/445 |
| 7,209,180 B2 * | 4/2007 | Takagi et al. | 348/558 |
| 7,212,218 B2 * | 5/2007 | Suzuki et al. | 345/660 |
| 7,262,811 B2 * | 8/2007 | Burke | 348/561 |
| 7,262,812 B2 * | 8/2007 | Burke | 348/561 |
| 7,339,627 B2 * | 3/2008 | Schoner et al. | 348/558 |
| 7,349,031 B2 * | 3/2008 | Hosomi | 348/558 |
| 7,424,148 B2 * | 9/2008 | Goh | 382/169 |
| 7,440,033 B2 * | 10/2008 | Salzer et al. | 348/458 |
| 7,502,513 B2 * | 3/2009 | Linzer | 382/224 |
| 7,538,821 B2 * | 5/2009 | Ahn et al. | 348/558 |
| 7,612,830 B2 * | 11/2009 | Seo et al. | 348/556 |
| 7,643,091 B2 * | 1/2010 | Harris | 348/558 |
| 2004/0114049 A1 * | 6/2004 | Arora | 348/445 |

FOREIGN PATENT DOCUMENTS

| | | |
|---|---|---|
| JP | 06-175641 | 6/1994 |
| JP | 09-018797 | 1/1997 |
| JP | 3429842 B2 | 5/2003 |
| JP | 2004186803 A | 7/2004 |
| JP | 2005-203933 A | 7/2005 |

* cited by examiner

IMAGE SIGNAL PROCESSING APPARATUS, IMAGE DISPLAY AND IMAGE DISPLAY METHOD

CROSS-REFERENCE TO RELATED APPLICATIONS

This application claims priority from Japanese Patent Application No. JP 2006-159316 filed in the Japanese Patent Office on Jun. 8, 2006, the entire content of which is incorporated herein by reference.

BACKGROUND OF THE INVENTION

1. Field of the Invention

The present invention relates to an image signal processing apparatus and an image display each having a function of detecting a black band region included in an image signal, and an image display method performing such a black band detecting process.

2. Description of the Related Art

Image displays such as television receivers (TVs) typically have an image processing function which makes image quality correction to an input image (for example, functions such as luminance or contrast control, and contour correction). Such an image processing function is performed by acquiring, for example, the average peak level (APL) of an input image signal or the histogram distribution of a luminance level, and is effectively applied, because gradation is improved by preventing an image from appearing too dark or preventing poor reproduction of black.

Among image signals from DVDs containing Cinemascope size images or image signals transmitted from broadcast stations, there are a signal called a letterbox including black band regions above and below an image region, and a signal called a side panel including black band regions on the right and the left of an image region. When the above-described image processing is performed on such an image signal including the black band regions, the image processing is performed also on the black band regions which are independent of the contents of the image region, so image quality is not appropriately corrected, and the effect of the image processing is reduced.

Therefore, to effectively detect a black band region included in an input image signal in such a manner, various methods are proposed (for example, refer to Japanese Patent No. 3429842 and Japanese Unexamined Patent Application Publication Nos. H05-27736 and 2005-203933.

SUMMARY OF THE INVENTION

However, in detection methods shown in Japanese Patent No. 3429842 and Japanese Unexamined Patent Application Publication Nos. H05-27736 and 2005-203933, the presence or absence of the black band region is determined on a line-by-line basis in each frame, so it takes a very long time to detect the whole black band region. Therefore, for example, when scenes are changed, a detecting process goes back to the beginning during the middle of the detecting process, thereby the detecting process may not be completed. In recent years, for example, like full HD (High Definition) TVs, the resolutions of image displays are increased, so it is very important to appropriately perform a black band detecting process in a short time.

In view of the foregoing, it may be desirable to provide an image signal processing apparatus, an image display and an image display method capable of detecting a black band region included in an input image signal in a shorter time.

According to an embodiment of the invention, there is provided a first image signal processing apparatus which may include a measuring means for measuring in a unit frame period whether each pixel in a designated measurement region of an input image signal has a signal level less than a threshold value; and a black band detecting means for detecting a black band region included in the input image signal on the basis of a measurement result from the measuring means.

In this case, the above-described black band detecting means may detect the pixel number of pixels with a signal level less than a threshold value which continues from an end of the measurement region, and may perform the detecting process along an end of the measurement region to determine the minimum value of the detected pixel number as the width of a black band region.

In addition, "a unit frame" may mean one or a few image frames or one or a few image fields.

According to an embodiment of the invention, there is provided a first image display which may include a display means for displaying an image on the basis of a detection result from the black band detecting means in addition to the measuring means and the black band detecting means in the first image signal processing apparatus according to the embodiment of the invention.

According to an embodiment of the invention, there is provided a first image display method which may include measuring in a unit frame period whether each pixel in a designated measurement region of an input image signal has a signal level less than a threshold value; detecting a black band region included in the input image signal on the basis of a measurement result; and displaying an image on the basis of a detection result of the black band region.

In the first image signal processing apparatus, the first image display and the first image display method according to the embodiment of the invention, whether each pixel in a measurement region of an input image signal has a signal level less than a threshold value may be measured in a unit frame period, and on the basis of the measurement result, a black band region included in the input image signal is detected.

According to an embodiment of the invention, there is provided a second image signal processing apparatus which may include a measuring means for measuring in a unit frame period whether each pixel in a designated measurement region of an input image signal has a signal level less than a threshold value; a basic region providing means for providing a basic region as a basic part to be measured; an increment/decrement value providing means for providing an increment/decrement value in the measurement region; a measurement region determining means for determining the measurement region on the basis of the basic region and the increment/decrement value; and a black band detecting means for detecting a black band region included in the input image signal on the basis of a measurement result from the measuring means, wherein the increment/decrement value providing means resets the increment/decrement value to half of the previous value, the measurement region determining means selectively resets a new measurement region by adding or subtracting the new increment/decrement value to or from the previous measurement region depending on whether the boundary between a black band region and an image region is detected by the black band detecting means, and the measuring means performs the measurement on a new measurement region.

According to an embodiment of the invention, there is provided a second image display which may include a display means for displaying an image on the basis of a detection result from the black band detecting means in addition to the above-mentioned means.

According to an embodiment of the invention, there is provided a second image display method which may include measuring in a unit frame period whether each pixel in a designated measurement region of an input image signal has a signal level less than a threshold value; providing a basic region as a basic part to be measured; providing an increment/decrement value in the measurement region; determining the measurement region on the basis of the basic region and the increment/decrement value; detecting a black band region included in the input image signal on the basis of a measurement result; and displaying an image on the basis of a detection result of the black band region, wherein the increment/decrement value is reset to half of the previous value, a new measurement region is selectively reset by adding or subtracting the new increment/decrement value to or from the previous measurement region depending on whether the boundary between a black band region and an image region is detected from the measurement result, and the measurement is performed on a new measurement region.

In the second image signal processing apparatus, the second image display and the second image display method according to the embodiment of the invention, whether each pixel in a measurement region of an input image signal has a signal level less than a threshold value may be measured in a unit frame period, and on the basis of the measurement result, a black band region included in the input image signal is detected. At this time, a basic region as a basic part to be measured and an increment/decrement value in the measurement region may be provided, and on the basis of the basic region and the increment/decrement value, the above-described measurement region may be determined. Moreover, depending on whether the boundary between a black band region and an image region may be detected from the measurement result, a new measurement region may be set by adding or subtracting ½ of the previous increment/decrement value as a new increment/decrement value to or from the previous measurement region. Then, the measurement may be performed on a new measurement region.

In the first image signal processing apparatus, the first image display or the first image display method according to the embodiment of the invention, whether each pixel in a measurement region of an input image signal has a signal level less than a threshold value may be measured in a unit frame period, and on the basis of the measurement result, a black band region included in the input image signal may be detected, so compared to related arts, a black band region included in the input image signal may be detected in a shorter time.

Moreover, in the second image signal processing apparatus, the second image display or the second image display method according to the embodiment of the invention, from a measurement result of whether each pixel in a measurement region of an input image signal has a signal level less than a threshold value, the boundary between a black band region and an image region may be detected, and a new measurement region may be determined by adding or subtracting ½ of the previous increment/decrement value to or from the previous measurement region depending on whether the boundary is detected, and a new measurement region may be repeatedly measured, and on the basis of the measurement result, a black band region may be detected, so compared to related arts, a black band region included in the input image signal may be detected in a shorter time.

Other and further objects, features and advantages of the invention will appear more fully from the following description.

DETAILED DESCRIPTION

A preferred embodiment will be described in detail below referring to the accompanying drawings.

Figure 1:
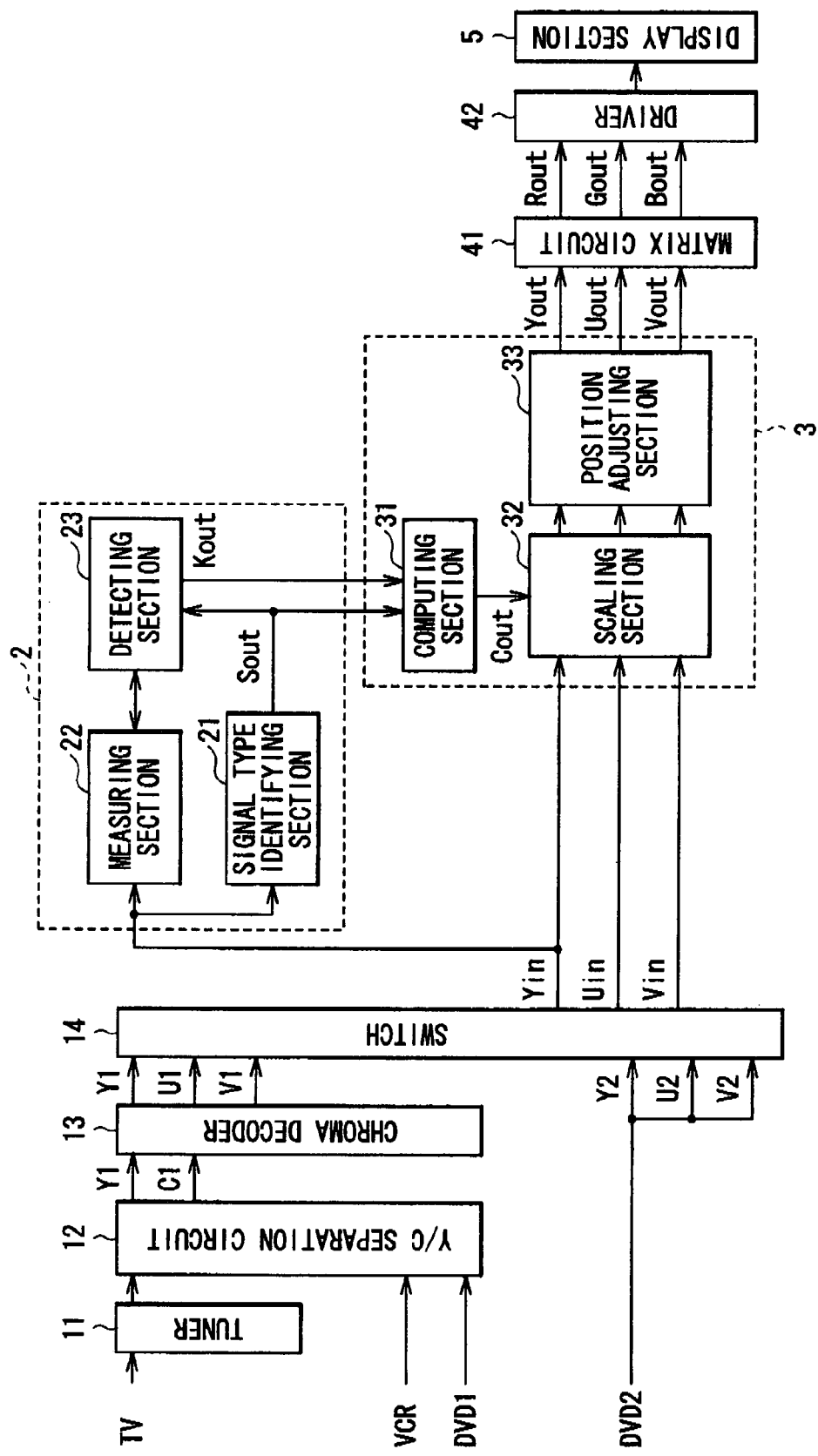
FIG. 1 is a block diagram showing the whole structure of an image display according to an embodiment of the invention.

FIG. 1 shows the whole structure of an image display according to an embodiment of the invention. The image display includes a tuner 11, a Y/C separation circuit 12, a chroma decoder 13, a switch 14, a black band detecting section 2, an image processing section 3, a matrix circuit 41, a driver 42 and a display section 5. An image signal processing apparatus and an image display method according to an embodiment of the invention are embodied by the image display according to the embodiment, so they will be also described below.

Image signals inputted into the image display may be outputs from a VCR (Video Cassette Recorder), a DVD or the like in addition to a TV signal from a TV. It has become common practice for recent televisions and personal computers (PCs) to obtain image information from a plurality of kinds of media and display an image corresponding to each of the media.

The tuner 11 receives and demodulates the TV signal from the TV, and outputs the TV signal as a composite video burst signal (CVBS).

The Y/C separation circuit 12 separates the composite video burst signal from the tuner 11 or a composite video burst signal from a VCR or a DVD1 into a luminance signal Y1 and a chrominance signal C1 to output them.

The chroma decoder 13 outputs the luminance signal Y1 and the chrominance signal C1 separated by the Y/C separation circuit 12 as YUV signals (Y1, U1, V1) including the luminance signal Y1 and color-difference signals U1 and The YUV signals are image data of a two-dimensional digital image, and a set of pixel values corresponding to a position on an image. A luminance signal Y represents a luminance level, and takes an amplitude value between a white level which is 100% white and a black level. Moreover, a 100% white image signal is 100 (IRE) in a unit called IRE (Institute of Radio Engineers) representing a relative ratio of an image signal. The black level is 0 IRE. On the other hand, the color-difference signals U and V correspond to a signal B-Y produced by subtracting the luminance signal Y from blue (B), and a signal R-Y produced by subtracting the luminance signal Y from red (R), respectively, and when the signals U and V are combined with the luminance signal Y, colors (hue, chroma saturation, luminance) can be shown.

The switch 14 switches YUV signals from a plurality of kinds of media (in this case, the YUV signals (Y1, U1, V1) and YUV signals (Y2, U2, V2) from a DVD2) so as to output selected signals as YUV signals (Yin, Uin, Vin).

The black band detecting section 2 detects a black band region included in the YUV signals (Yin, Uin, Vin) as input image signals, and more specifically, the black band detecting section 2 detects the black band region on the basis of the luminance signal Yin so as to output a detection result Kout to the image processing section 3 which will be described later. The black band detecting section 2 includes a signal type identifying section 21, a measuring section 22 and a detecting section 23.

Figure 2:
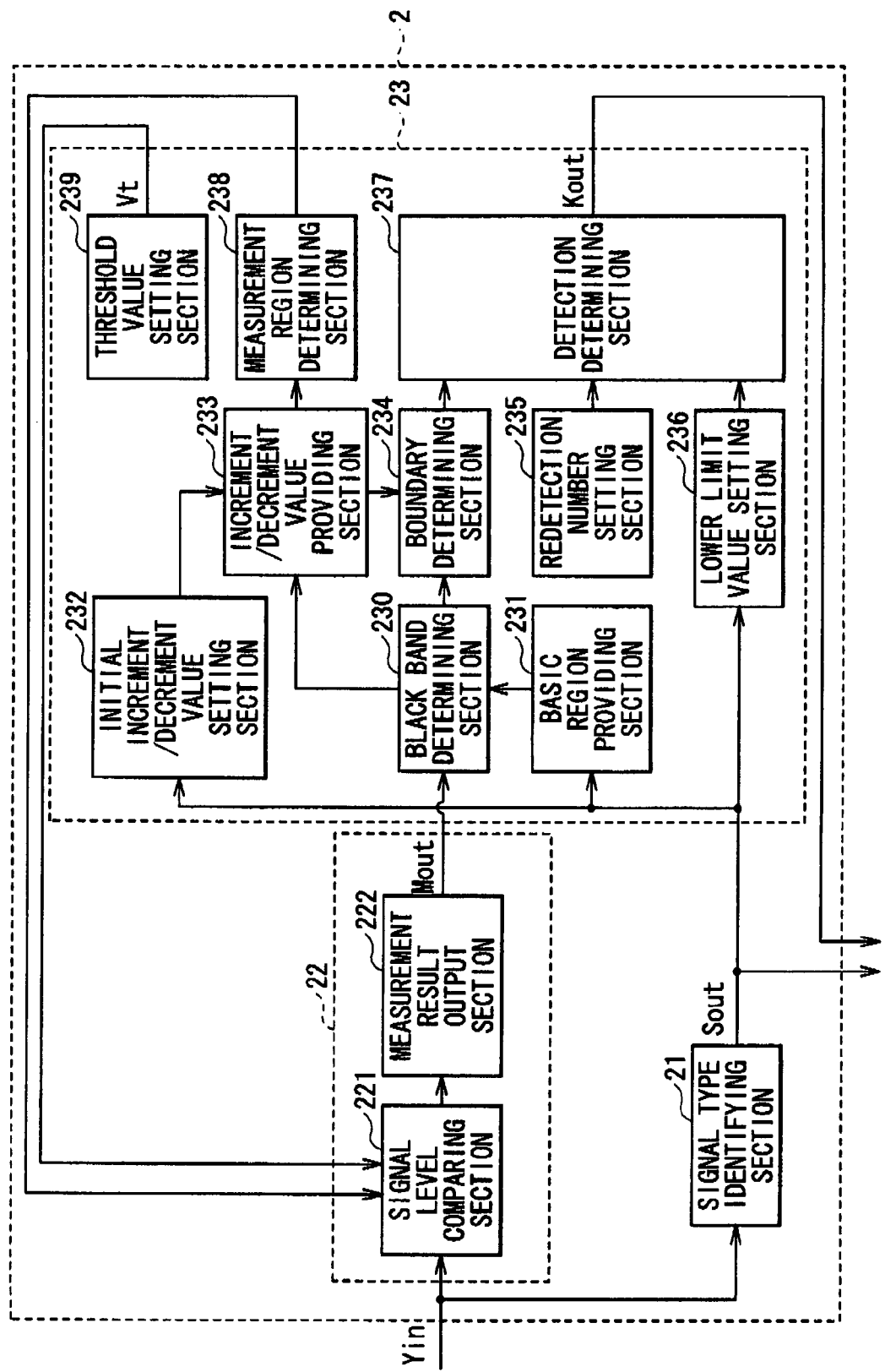
FIG. 2 is a block diagram showing a detailed structure of a black band detecting section shown in FIG. 1.

FIG. 2 shows a detailed structure of the black band detecting section 2.

The signal type identifying section 21 identifies the type of the input image signal, and more specifically, the signal type identifying section 21 identifies signal types such as, for example, an NTSC 480i signal and a PAL (Phase Alternating Line) 576i signal.

The measuring section 22 includes a signal level comparing section 221 and a measurement result output section 222, and performs predetermined measurement on a designated measurement region in the input image signals in a unit frame period. More specifically, the measuring section 22 measures whether the signal level of each pixel in the measurement region is less than a threshold value Vt set on the basis of the luminance signal Yin.

Figure 3A:
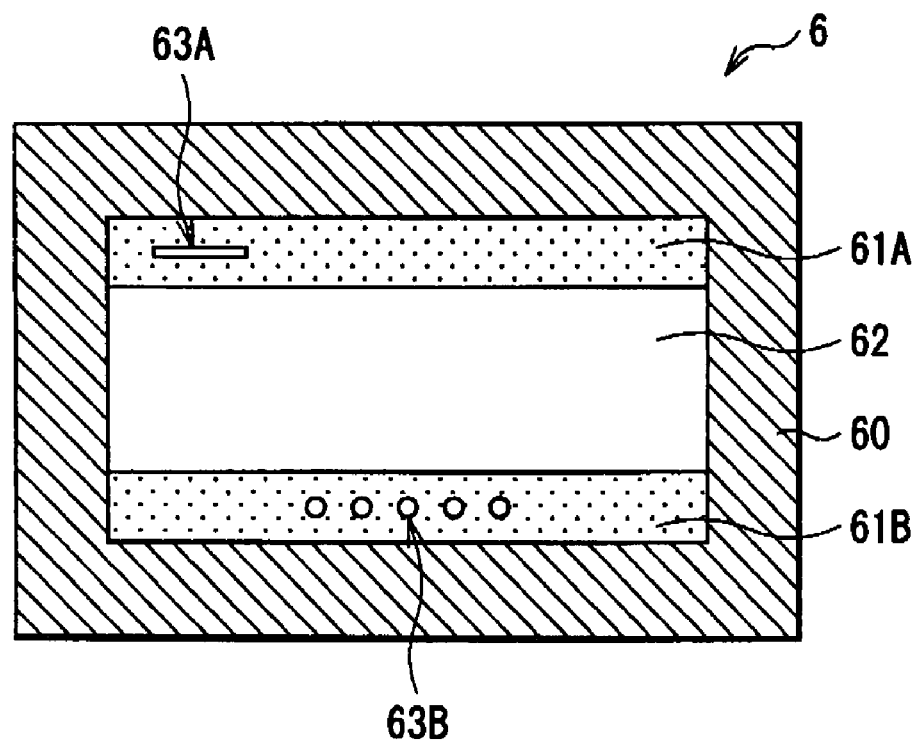
FIGS. 3A and 3B are schematic views for describing an input image signal including black band regions.
Figure 3B:
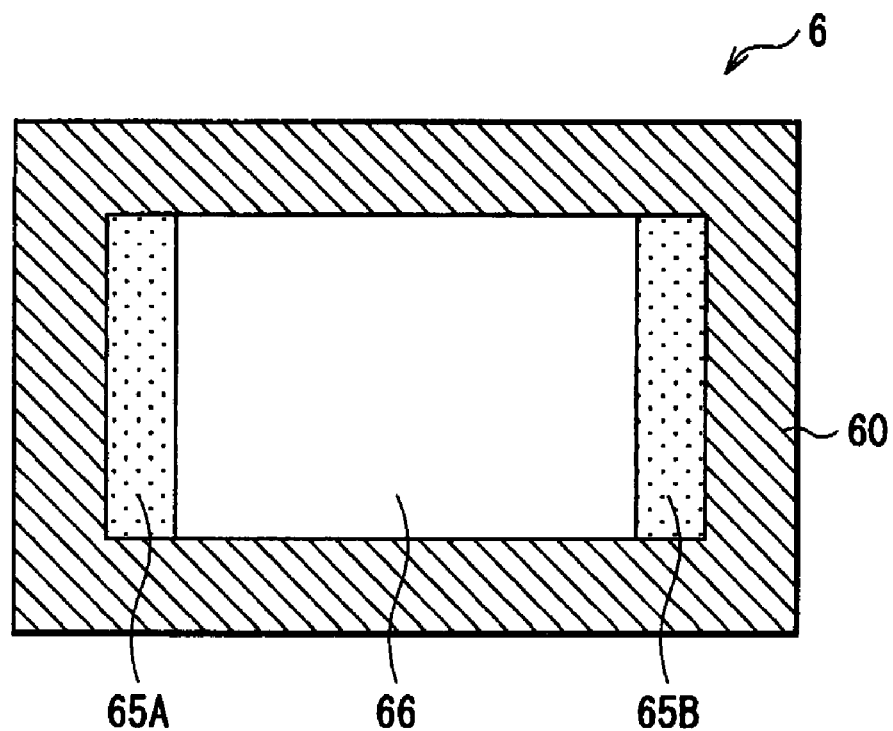

FIGS. 3A and 3B schematically show each region in the case where black band regions are included in an input image signal 6. FIG. 3A shows the case where black band regions 61A and 61B are arranged above and below an image region 62, and corresponds to, for example, a Cinemascope size image signal. Moreover, in the black band region 61A, an OSD (On Screen Display) 63A is inserted, and in the black band region 61B, subtitles 63B are inserted. Further, a blanking region 60 is arranged around the image region 62 and the black band regions 61A and 61B. On the other hand, FIG. 3B shows the case where black band regions 65A and 65B are arranged on the right and the left of an image region 66, and corresponds to, for example, a side panel image signal or the like. The blanking region 60 is arranged around the image region 66 and the black band regions 65A and 65B. In addition, there is the case where an OSD or subtitles are inserted in black band regions or the case where an OSC or subtitles are not inserted in black band regions, and even in the case where an OSC or subtitles are inserted, the OSC or the subtitles may be inserted in either or both of black band regions above and below an image region or on the right and the left of an image region.

Figure 4A:
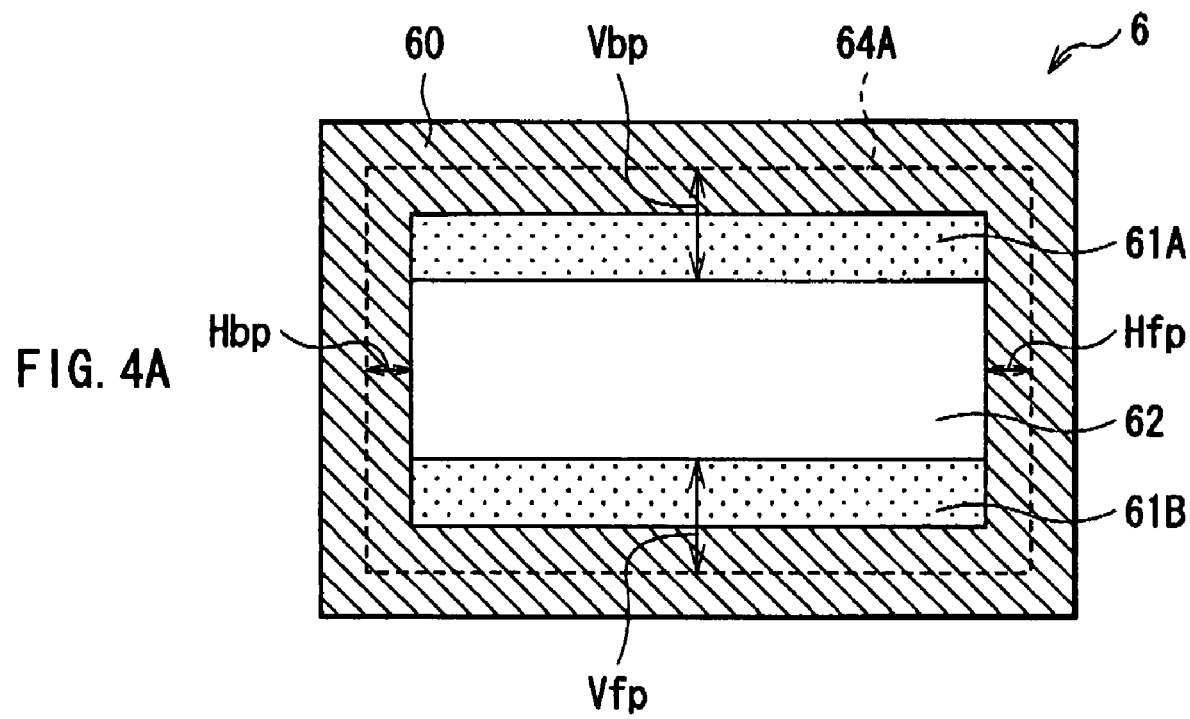
FIGS. 4A and 4B are schematic views for describing a measuring process by a measuring section.

For example, as shown in FIG. 4A, the signal level comparing section 221 compares between the signal level of the luminance signal Yin in each pixel and the signal level of the set threshold value Vt in the designated measurement region 64A of the input image signal 6 in the unit frame period, and outputs the pixel position with a signal level equal to or larger than the threshold value Vt. For example, the threshold value Vt is set so that the pixel position of the image region 62 is outputted and the pixel positions of the blanking region 60 and the black band regions 61A and 61B are not outputted.

Figure 4B:
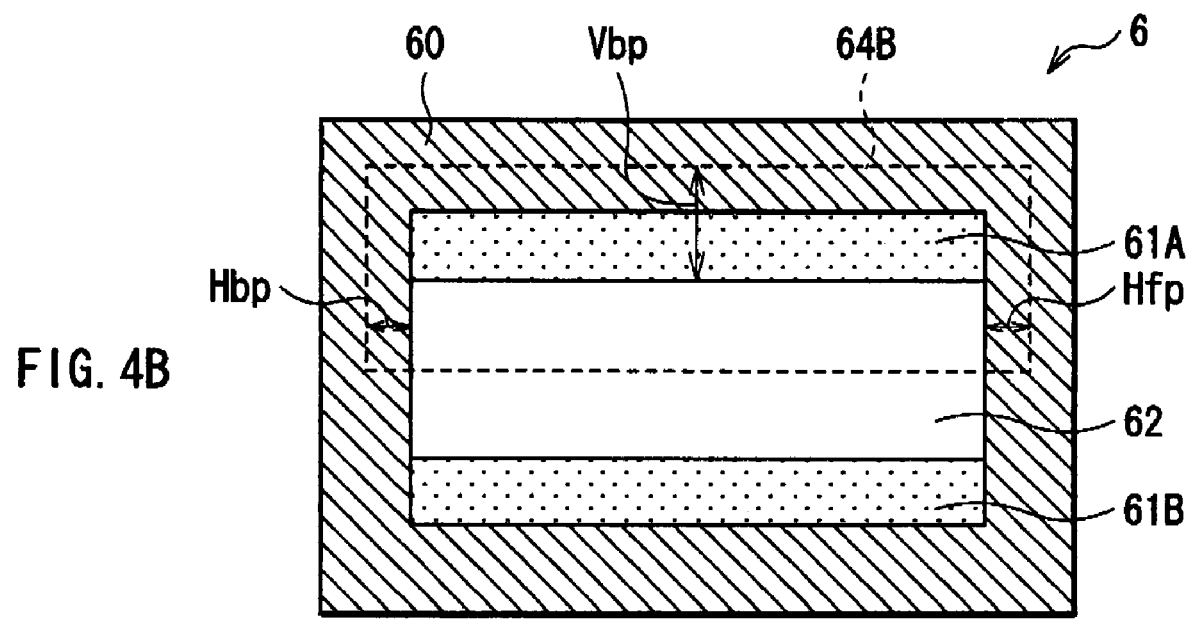

Moreover, the measurement result output section 222 determines and outputs a horizontal back porch length Hbp, a horizontal front porch length Hfp, a vertical back porch length Vbp and a vertical front porch length Vfp in the measurement region 64A as shown in FIG. 4A on the basis of the pixel position with a signal level equal to or larger than the threshold value Vt which is outputted from the signal level comparing section 221. The measurement region 64A in FIG. 4A shows the case where the measurement region 64A is a basic region as a basic part for detecting a black band; however, for example, like a measurement region 64B shown in FIG. 4B, the zone of a measurement region can be freely determined. The increase or degrease in the zone of the measurement region will be described later.

The detecting section 23 detects a black band region actually included in the input image signal 6 on the basis of the measurement results of the horizontal back porch length Hbp, the horizontal front porch length Hbp, the vertical back porch length Vbp and the vertical front porch length Vfp by the measuring section 22 and a signal type identifying result Sout by the signal type identifying section 21. The detecting section 23 includes a black band determining section 230, a basic region providing section 231, an initial increment/decrement value setting section 232, an increment/decrement value providing section 233, a boundary determining section 234, a redetection number setting section 235, a lower limit value setting section 236, a detection determining section 237, a measurement region determining section 238 and a threshold value setting section 239.

The black band determining section 230 determines whether a measurement result Mout including the horizontal back porch length Hbp, the horizontal front porch length Hfp, the vertical back porch length Vbp and the vertical front porch length Vfp by the measuring section 22 is a measurement result of a black band.

Figure 5:
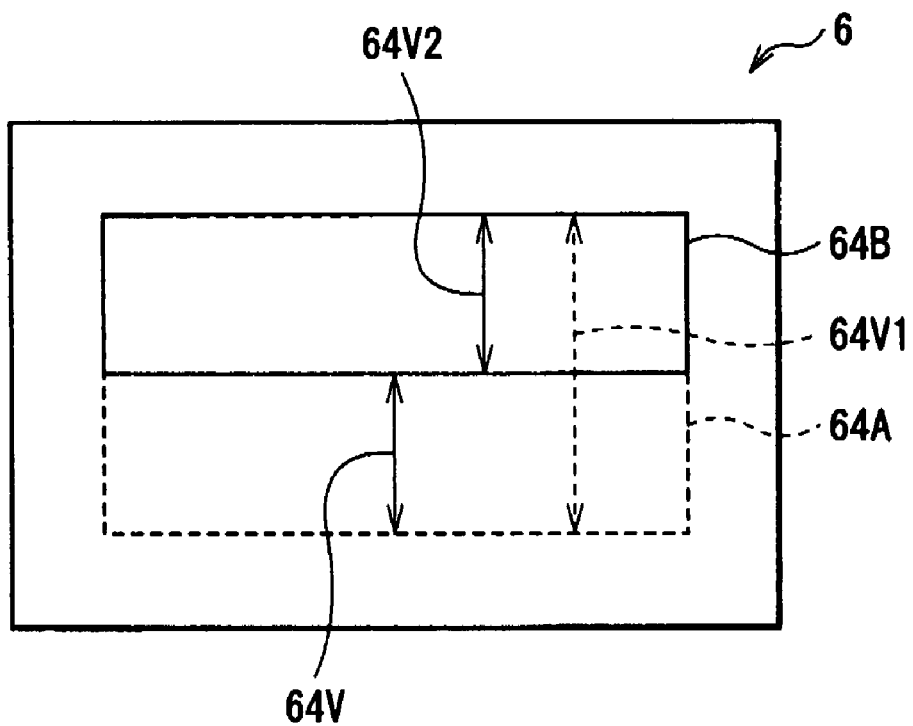
FIG. 5 is a schematic view for describing an increment/decrement value in a measurement region.

The basic region providing section 231 provides the basic region as a basic part for detecting a black band, and provides the basic region according to the signal type identifying result Sout by the signal type identifying section 21, for example, as in the case of the basic region 64A in the input image signal 6 shown in FIG. 5. Moreover, the initial increment/decrement value setting section 232 is a section setting an initial change amount (an initial increment/decrement value) at the time of changing the measurement zone by the measuring section 22. The increment/decrement value is shown like an increment/decrement value 64V in the case where the measurement zone is changed from the measurement region 64A to the measurement region 64B in a vertical direction as shown in FIG. 5, and is shown in the same manner in the case where the measurement zone is changed in a horizontal direction. Further, the initial increment/decrement value setting section 232 sets an initial increment/decrement value to a power-of-two value ($2^n$ (n: natural number)) according to the signal type identifying result Sout by the signal type identifying section 21. More specifically, for example, in the case where the input image signal 6 is an NTSC 525i signal, the initial increment/decrement value is set to 64, and in the case where the input image signal 6 is a 525p signal converted into a progressive signal, the initial increment/decrement value is set to 128.

The increment/decrement value providing section 233 provides the increment/decrement value in the measurement zone on the basis of the initial increment/decrement value set by the initial increment/decrement value setting section 232 and the determination result by the black band determining section 230. More specifically, the absolute value of the increment/decrement value starts from the initial value set by the initial increment/decrement value setting section 232, and resets a new increment/decrement value to ½ of the previous increment/decrement value in each measurement of one unit frame. Moreover, whether the absolute value of the increment/decrement value is added to or subtracted from the present measurement zone is determined on the basis of the determination result by the black band determining section 230 which will be described later.

The boundary determining section 234 determines boundaries between the black band regions 61A, 61B, 65A and 65B and the image regions 62 and 66 on the basis of the determination result by the black band determining section 230 and the increment/decrement value in the measurement zone provided by the increment/decrement value providing section 233.

Figure 6:
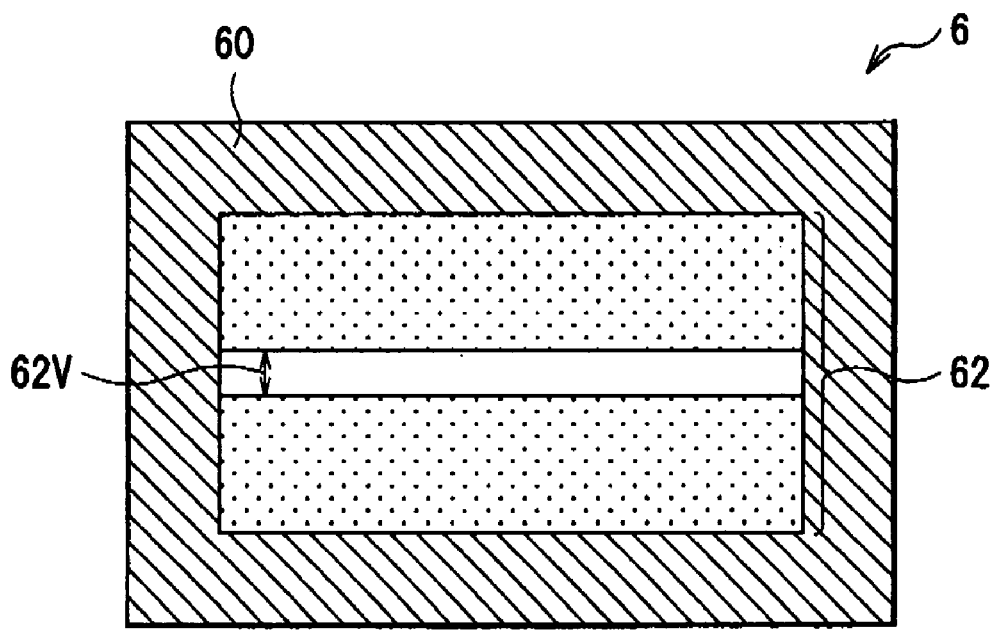
FIG. 6 is a schematic view for describing a lower limit value of the width of an image region.

The redetection number setting section 235 sets the redetection number at the time of finally specifying a black band region in the detection determining section 237 which will be described later. The redetection number is represented by an integer of 0 or more. Moreover, the lower limit value setting section 236 sets the lower limit value of the horizontal width or the vertical width of the image region 62 determined by calculation from the boundary of the black band region determined by the boundary determining section 234 on the basis of the signal type identifying result Sout by the signal type identifying section 21. In the case of the vertical width of the image region 62 is represented by, for example, a vertical width 62V shown in FIG. 6, and when the lower limit value is set to the vertical width 62V, false detection in a dark scene or the like (FIG. 6 shows the case where a black band region is not present in the input image signal 6, and a dark scene or the like by an image signal 6 is displayed) is prevented.

The detection determining section 237 finally determines the black band region included in the input image signal 6 on the basis of the boundary determination result of the black band region by the boundary determining section 234, the redetection number set by the redetection number setting section 235 and the lower limit value of the image region width set by the lower limit value setting section 236, and outputs the determined black band detection result Kout to the image processing section 3.

The measurement region determining section 238 determines a measurement region in the measuring section 22 on the basis of the increment/decrement value in the measurement zone provided by the increment/decrement value providing section 233, and successively outputs the measurement region to the signal level comparing section 221. Moreover, the threshold value setting section 239 sets the threshold value Vt of the signal level used in the measurement in the measuring section 22, and outputs the threshold value Vt to the signal level comparing section 221. As described above, a region with a signal level less than the threshold value Vt in the measurement region may be a black band region.

Referring back to FIG. 1, the image processing section 3 performs image processing on the YUV signals (Yin, Uin, Vin) as the input image signals on the basis of the black band detection result Kout by the black band detecting section 2 and the type identifying result Sout of the input image signal by the signal type identifying section 21 in the black band detecting section 2. More specifically, while maintaining the aspect ratio of the input image signal, a process of increasing or decreasing the input image signal (an aspect ratio adjustment process) is performed, and the image processing section 3 includes a computing section 31 computing the scaling ratio of the input image signal on the basis of the display size (pixel number) of the display section 5, the black band detection result Kout and the type identifying result Sout, a scaling section 32 scaling the YUV signals (Yin, Uin, Vin) as the input image signals on the basis of a computing result Cout (the scaling ratio) by the computing section 31, and a position adjusting section 33 performing position adjustment on the scaled image signals so as to prevent subtitles from being missed in the black band region by the scaling section 32.

The matrix circuit 41 reproduces RGB signals from the YUV signals (Yout, Uout, Vout) after image processing (aspect ratio adjustment process) by the image processing section 3, and outputs the reproduced RGB signals (Rout, Gout, Bout) to the driver 42.

The driver 42 produces a driving signal for the display section 5 on the basis of the RGB signals (Rout, Gout, Bout) outputted from the matrix circuit 41, and outputs the driving signal to the display section 5.

The display section 5 displays an image on the basis of the YUV signals (Yout, Uout, Vout) after the image processing (the aspect ratio adjustment process) by the image processing section 3 according to the driving signal outputted from the driver 42. The display section 5 may be any kind of display device. For example, a CRT (Cathode-Ray Tube), a LCD (Liquid Crystal Display), a PDP (Plasma Display Panel), an organic or inorganic EL (ElectroLuminescence) display or the like is used.

Next, the operation of the image display according to the embodiment will be described below. At first, the basic operation of the image display will be described below.

At first, an image signal to be inputted into the image display is demodulated into the YUV signals. More specifically, a TV signal from the TV is demodulated into a composite video burst signal by the tuner 11, and a composite video burst signal is directly inputted into the image display from the VCR or the DVD1. Then, the composite video burst signals are separated into the luminance signal Y1 and the chrominance signal C1 in the Y/C separation circuit 12, and then the luminance signal Y1 and the chrominance signal C1 are decoded into the YUV signals (Y1, U1, V1) in the chroma decoder 13. On the other hand, YUV signals (Y2, U2, V2) are directly inputted into the image display from the DVD2.

Next, in the switch 14, either the YUV signals (Y1, U1, V1) or the YUV signals (Y2, U2, V2) are selected to be outputted as the YUV signals (Yin, Uin, Vin). Then, the luminance signal Yin of the YUV signals (Yin, Uin, Vin) is outputted into the signal type identifying section 21 and the measuring section 22 in the black band detecting section 2 and the scaling section 32 in the image processing section 3, and the color-difference signals Uin and Vin are outputted to the scaling section 32 in the image processing section 3.

In this case, in the black band detecting section 2, the black band region included in the YUV signals (Yin, Uin, Vin) as the input image signals is detected. Specifically, the black band region is detected on the basis of the luminance signal Yin, and the detection result Kout is outputted to the image processing section 3. More specifically, the measuring section 22 measures in the unit frame period whether the luminance signal Yin in each pixel in the designated measurement region of the input image signals has a signal level less than the threshold value Vt, and the detecting section 23 detects the black band region included in the input image signal 6 on the measurement results of the horizontal back porch length Hbp, the horizontal front porch length Hfp, the vertical back porch length Vbp and the vertical front porch length Vfp by the measuring section 22 and the signal type identifying result Sout by the signal type identifying section 21, and the black band detection result Kout is outputted to the image processing section 3.

Moreover, on the basis of the black band detection result Kout by the black band detecting section 2 and the type identifying result Sout of the input image signal by the signal type identifying section 21, the image processing section 3 performs image processing, more specifically a process of scaling the input image signal while maintaining the aspect ratio of the input image signal (the aspect ratio adjustment process) on the YUV signals (Yin, Uin, Vin) as the input image signals.

Then, the matrix circuit 41 reproduces RGB signals (Rout, Gout, Bout) from the YUV signals (Yout, Uout, Vout) after image processing, (the aspect ratio adjustment process) by the image processing section 3, and the driver 42 produces a driving signal on the basis of the RGB signals (Rout, Gout, Bout), and an image is displayed on the display section 5 on the basis of the driving signal.

Next, referring to FIGS. 7 through 10, a measuring process by the measuring section 22 as one of characteristic parts of the invention will be described in detail below.

FIGS. 7 through 10 show examples of a method of measuring the horizontal back porch length Hbp, the horizontal front porch length Hfp, the vertical back porch length Vbp and the vertical front porch length Vfp by the measuring section 22 with timing charts. In these drawings, Hsync indicates a horizontal synchronizing signal, Vsync indicates a vertical synchronizing signal, Clock indicates a clock (dot clock) signal corresponding to the period of each pixel, H_act indicates a horizontal active signal corresponding to the pixel position with a signal level equal to or higher than the threshold value Vt in a horizontal direction, V_act indicates a vertical active signal which becomes active in the case where the horizontal active signal H_act attains "H" level even in one pixel in each horizontal period, Hbp_cnt indicates a horizontal back porch counter output, Hfp_cnt indicates a horizontal front porch counter output, Vbp_cnt indicates a vertical back porch counter output, Vfp_cnt indicates a vertical front porch counter output, Hbp_lat indicates a horizontal back porch latch output corresponding to a latched (maintained) fixing value of the horizontal back porch counter output Hbp_cnt in the previous horizontal period, Hfp_lat indicates a horizontal front porch latch output corresponding to a latched fixing value of the horizontal front porch counter output Hfp_cnt in the previous horizontal period, Hbp_out indicates a horizontal back porch length output finally outputted as the fixing value of the horizontal back porch length Hbp, Hfp_out indicates a horizontal front porch length output finally outputted as the fixing value of the horizontal front porch length Hfp, Vbp_out indicates a vertical back porch length output corresponding to a latched fixing value of the vertical back porch counter output Vbp_cnt in the previous vertical period and finally outputted as the fixing value of the vertical back porch length Vbp, and Vfp_out indicates a vertical front porch length output corresponding to a latched fixing value of the vertical front porch counter output Vfp_cnt in the previous vertical period and finally outputted as the fixing value of the vertical front porch length Vfp. Moreover, "<" in the luminance signal Yin indicates a signal level less than the threshold value Vt, and ">" indicates a signal level equal to or larger than the threshold value.

Figure 7:
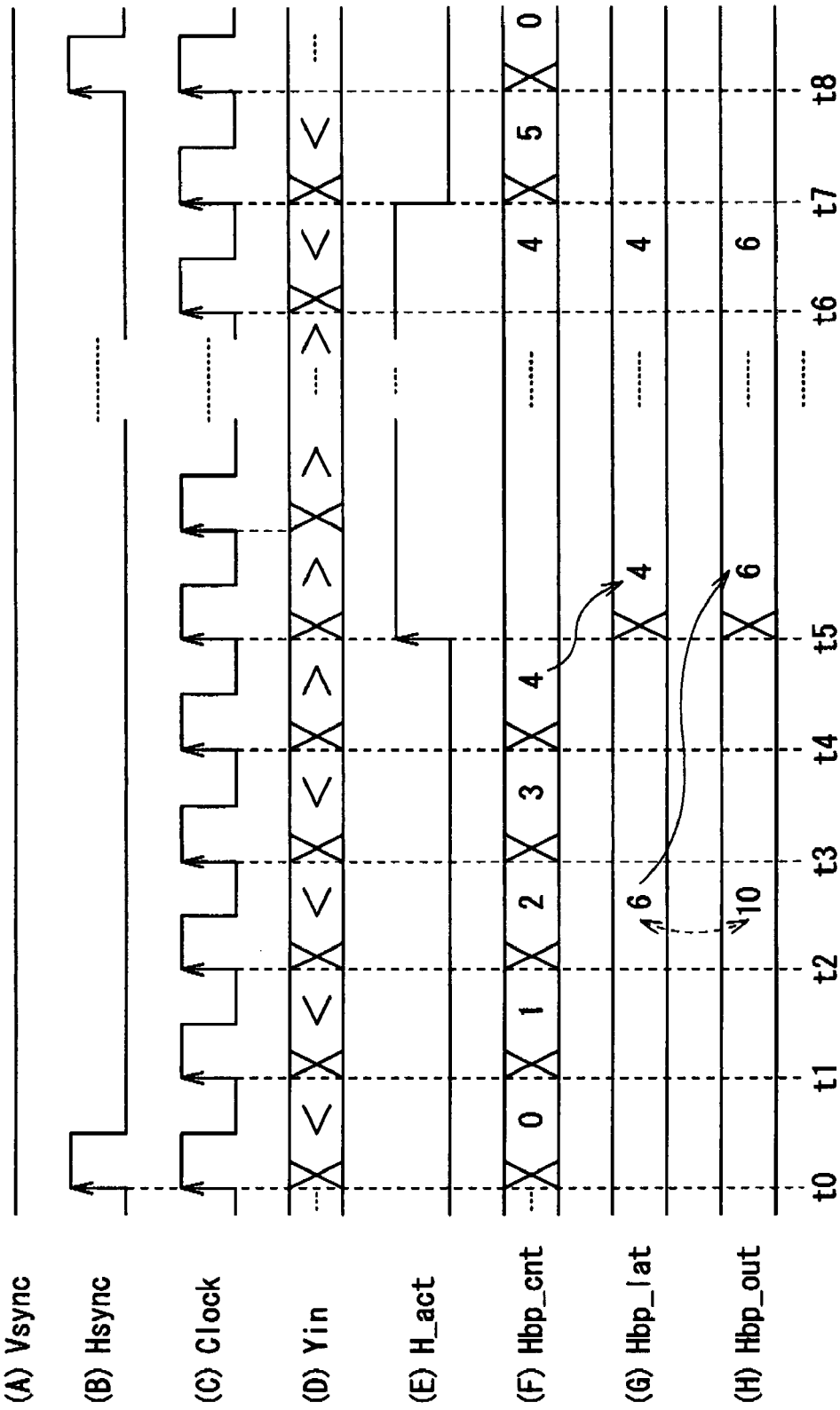
FIG. 7 is a timing chart for describing a process of measuring a horizontal back porch length.

At first, the horizontal back porch length Hbp shown in FIG. 7 is measured as will be described below.

When the horizontal synchronizing signal Hsync (refer to FIG. 7(B)) attains "H" level at a timing t0, at the rising edge of the horizontal synchronizing signal Hsync, the horizontal back porch counter output Hbp_cnt (refer to FIG. 7(F)) is reset, and "0" is outputted. After the timing t0, the value of the horizontal back porch counter output Hbp_cnt is incremented by one at each of the rising edges (timings t1, t2, . . . ) of the clock signal Clock (refer to FIG. 7(C)).

Next, when the luminance signal Yin (refer to FIG. 7(D)) has a signal level equal to or larger than the threshold value Vt at a timing t4, the horizontal active signal H_act (refer to FIG. 7(E)) attains "H" level at a timing t5 which is the next rising edge of the clock signal Clock. Thereby, while the horizontal active signal H_act is in "H" level (from the timing t5 to a timing t7), the value of the horizontal back porch counter output Hbp_cnt is fixed (in FIG. 7, the value is fixed at "4"). The value of the horizontal back porch counter output Hbp_cnt at this time is a fixing value in the horizontal period, and is updated and maintained as the horizontal back porch latch output Hbp_lat (refer to FIG. 7(G)). Moreover, at this time, the value ("6" in FIG. 7) of the horizontal back porch latch output Hbp_lat in the previous horizontal period (before updating) and the value ("10" in FIG. 7) of the horizontal back porch length output Hbp_out (refer to FIG. 7(H)) corresponding to the minimum value of the horizontal back porch length Hbp in previous measurement are compared, and a smaller value is updated (in FIG. 7, from "10" to "6") as a new horizontal back porch length output Hbp_out.

Next, when the luminance signal Yin has a signal level less than the threshold value Vt again at a timing t6, at the timing t7 which is the next rising edge of the clock signal Clock, the horizontal active signal H_act returns to "L" level, and the value of the horizontal back porch counter output Hbp_cnt is incremented by one again. Then, at a timing t8, when the horizontal synchronizing signal Hsync attains "H" level, the measurement of one horizontal period is completed.

As such measurement of one horizontal period is performed throughout the unit frame period, the horizontal back porch length Hbp determined by the minimum value of the number of pixels with a signal level less than the threshold value Vt which continues from the left end of the measurement region 64A or 64B is outputted from the measuring section 22 in a short time in the unit frame period.

Figure 8:
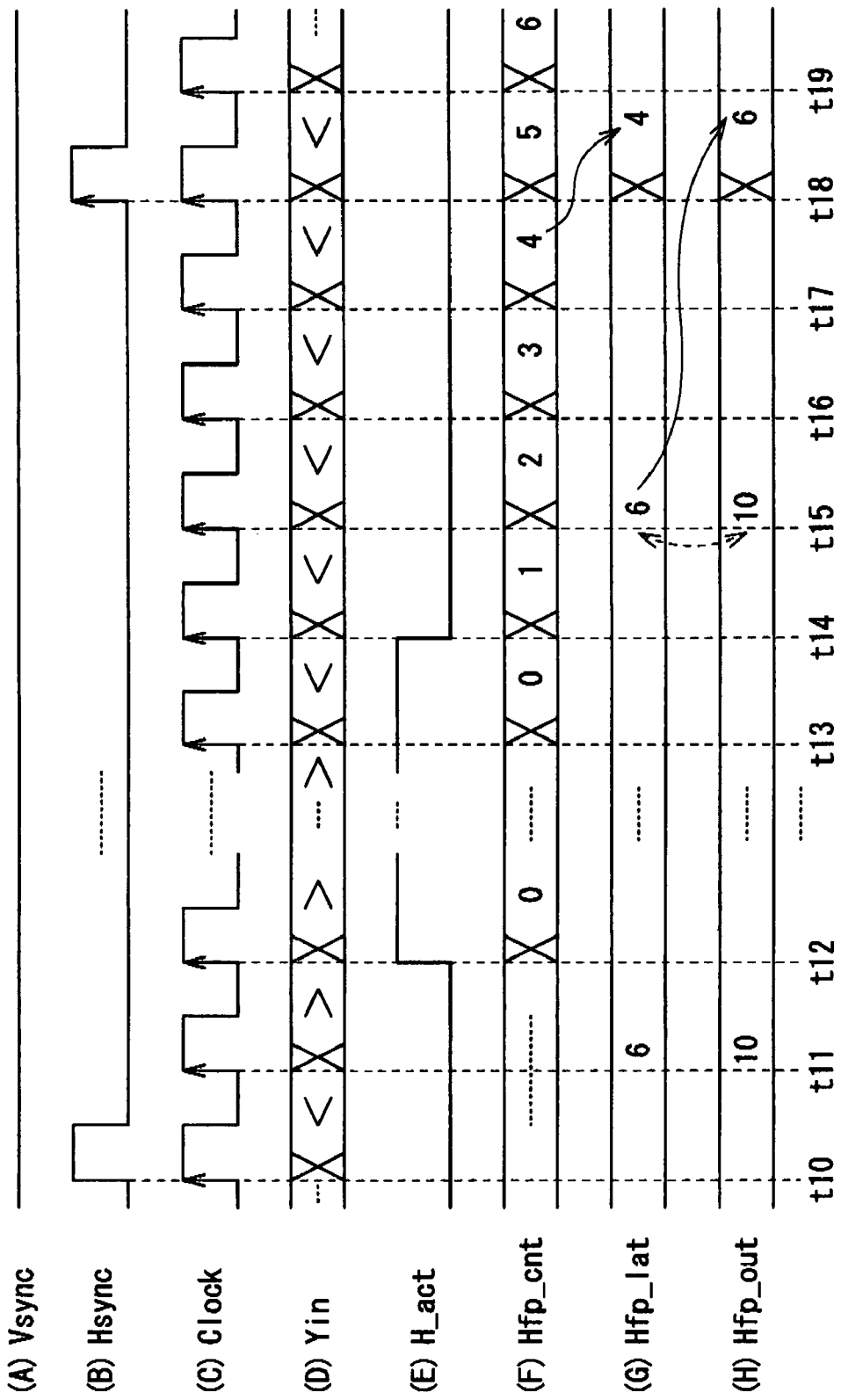
FIG. 8 is a timing chart for describing a process of measuring a horizontal front porch length.

Moreover, as will be described later, the horizontal front porch length Hfp shown in FIG. 8 is measured basically as in the case of the horizontal back porch length Hbp.

At first, when the horizontal synchronizing signal Hsync (refer to FIG. 8(B)) attains "H" level at a timing t10, and the luminance signal Yin (refer to FIG. 8(D)) has a signal level equal to or larger than the threshold value Vt at a timing t11, the horizontal active signal H_act (refer to FIG. 8(E)) attains "H" level at a timing t12 which is the next rising edge of the clock signal Clock (refer to FIG. 8(C)). Thereby, while the horizontal active signal H_act is in "H" level (from the timing t12 to a timing t14), the horizontal front porch counter output Hfp_cnt (refer to 8(F)) is reset, and "0" is outputted.

Next, when the luminance signal Yin has a signal level less than the threshold value Vt again at a timing t13, the horizontal active signal H_act returns to "L" level at the timing t14 which is the next rising edge of the clock signal Clock. Thereby, after the timing t14 (timing t14, t15, . . . ), the value of the horizontal front porch counter output Hfp_cnt is incremented by one.

Next, when the horizontal synchronizing signal Hsync attains "H" level again at a timing t18, the value of the horizontal front porch counter output Hfp_cnt at this time is a fixing value in the horizontal period, and is updated and maintained as the horizontal front porch latch output Hfp_lat (refer to FIG. 8(G)). Moreover, at this time, the value ("6" in FIG. 8) of the horizontal front porch latch output Hbp_lat in the previous horizontal period (before updating) and the value ("10" in FIG. 8) of the horizontal front porch length output Hfp_out (refer to FIG. 8(H)) corresponding to the minimum value of the horizontal porch length Hfp in the previous measurement are compared, and a smaller value is updated (from "10" to "6" in FIG. 8) as a new horizontal front porch length output Hfp_out. Thus, the measurement of one horizontal period is completed.

As such measurement of one horizontal period is performed throughout the unit frame period, the horizontal front porch length Hfp corresponding to the minimum value of the number of pixels with a signal level less than the threshold value Vt which continue from the right end of the measurement region 64A or 64B is outputted from the measuring section 22 in a short time in the unit frame period.

Figure 9:
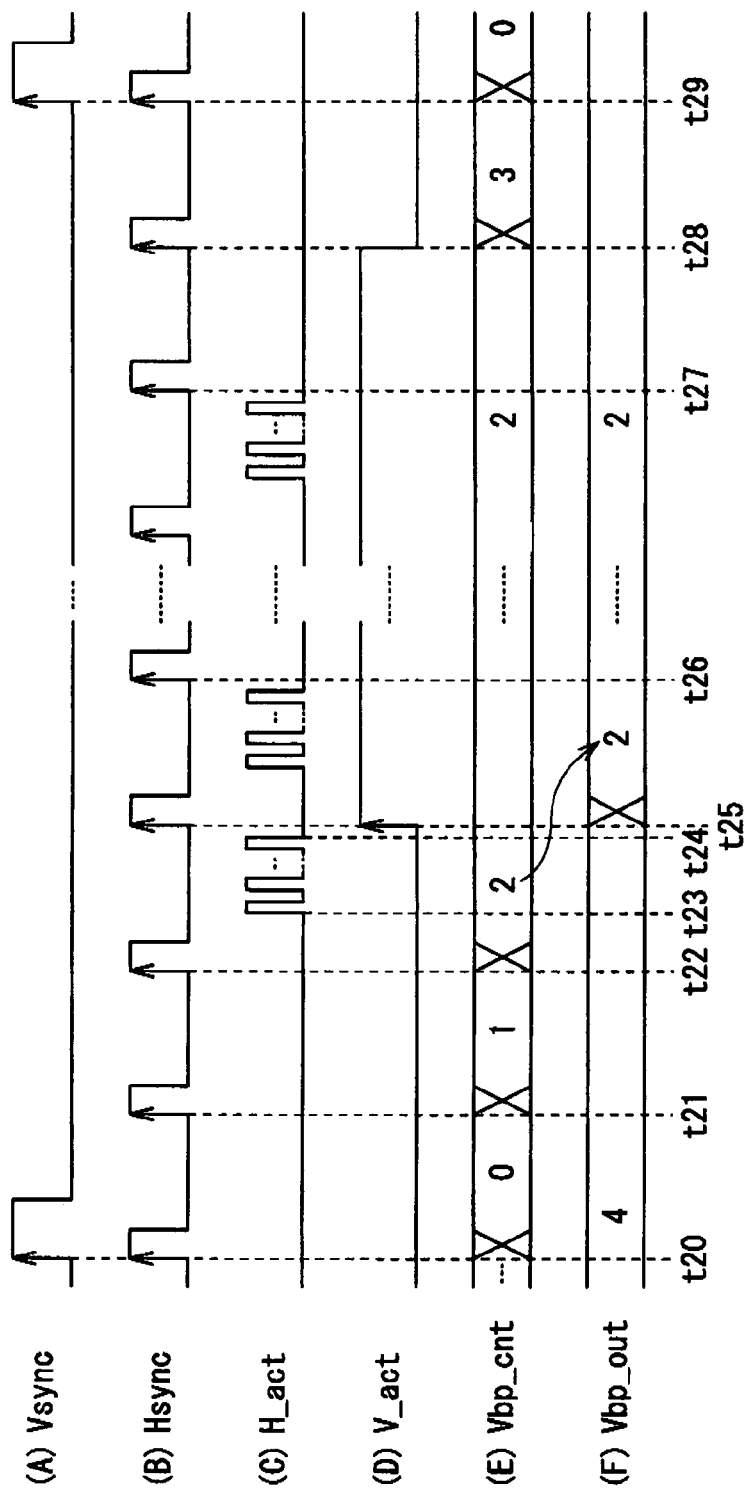
FIG. 9 is a timing chart for describing a process of measuring a vertical back porch length.

Moreover, as will be described below, the vertical back porch length Vbp shown in FIG. 9 is measured.

When the vertical synchronizing signal Vsync (refer to FIG. 9(A)) attains "H" level at a timing t20, at the rising edge of the vertical synchronizing signal Vsync, the vertical back porch counter output Vbp_cnt (refer to FIG. 9(E)) is reset, and "0" is outputted. Then, after the timing t20, the value of the vertical back porch counter output Vbp_cnt is incremented by one at each of the rising edges (timings t21, t22, . . . ) of the horizontal synchronizing signal Hsync (refer to FIG. 9(B)).

Next, when, from a timing t23 to a timing t24 in one horizontal period from a timing t22 to a timing t25, the luminance signal Yin has a signal level equal to or larger than the threshold value Vt, and the horizontal active signal H_act (refer to FIG. 9(C)) attains "H" level, at the timing t25 which is the next rising edge of the horizontal synchronizing signal Hsync, the vertical active signal V_act (refer to FIG. 9(D)) attains "H" level. Thereby, while the vertical active signal V_act is in "H" level (from the timing t25 to a timing t28), that is, while a period in which the horizontal active signal H_act is in "H" level in one horizontal period is present, the value of the vertical back porch counter output Vbp_cnt is fixed (in FIG. 9, the value is fixed to "2"). Moreover, the value of the vertical back porch counter output Vbp_cnt at this time is a fixing value in the vertical period, and is updated and maintained as the vertical back porch length output Vbp_out (refer to FIG. 9(F)).

Next, when the horizontal active signal H_act is fixed at "L" level in one horizontal period from a timing t27 to the timing t28, at the timing t28 which is the next rising edge of the horizontal synchronizing signal Hsync, the vertical active signal V_act returns to "L" level, and the value of the vertical back porch counter output Vbp_cnt is incremented by one again. Then, when the vertical synchronizing signal Vsync attains "H" level at a timing t29, the measurement of one vertical period is completed.

As such measurement of one vertical period is performed throughout the unit frame period (in the case where the unit frame period is one vertical period, only one vertical period), the vertical back porch length Vbp corresponding to the minimum value of the number of pixel with a signal level less than the threshold value Vt which continue from the top end of the measurement region 64A or 64B is outputted from the measuring section 22 in a short time in the unit frame period.

Figure 10:
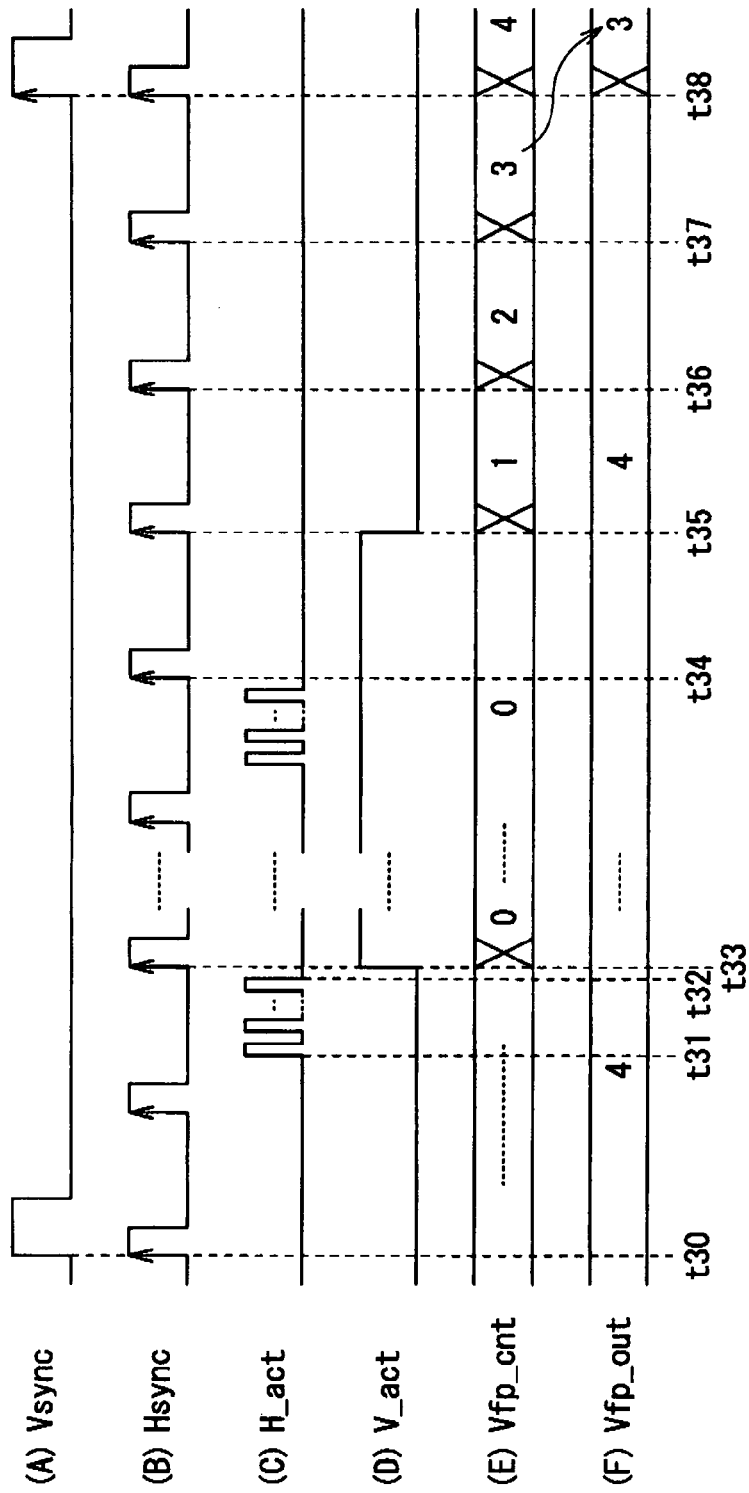
FIG. 10 is a timing chart for describing a process of measuring a vertical front porch length.

Moreover, as will be described below, the vertical front porch length Vfp shown in FIG. 10 is measured basically as in the case of the vertical back porch length Vbp.

At first, when the vertical synchronizing signal Vsync (refer to FIG. 10(A)) attains "H" level at a timing t30, and the luminance signal Yin has a signal level equal to or larger than the threshold value Vt so that the horizontal active signal H_act (refer to FIG. 10(C)) attains "H" level from a timing t31 to a timing t32, at a timing t33 which is the next rising edge of the horizontal synchronizing signal Hsync (refer to FIG. 10(B)), the vertical active signal V_act (refer to FIG. 10(D)) attains "H" level. Thereby, while the vertical active signal V_act is in "H" level (from the timing t33 to a timing t35), the vertical front porch counter output Vfp_cnt (refer to FIG. 10(E)) is reset, and "0" is outputted.

Next, when the horizontal active signal H_act is fixed to "L" level in one horizontal period from the timing t34 to the timing t35, at the timing t35 which is the next rising edge of the horizontal synchronizing signal Hsync, the vertical active signal V_act returns to "L" level. Thereby, after the timing t35 (timings t35, t36, . . . ), the value of the vertical front porch counter output Vfp_cnt is incremented by one.

Next, when the vertical synchronizing signal Vsync attains "H" level again at a timing t38, the value of the vertical front porch counter output Vfp_cnt at this time is a fixing value in the vertical period, and is updated and maintained as the vertical front porch length output Vfp_out (refer to FIG. 10(F)). Thus, the measurement of one vertical period is completed.

As such measurement of one vertical period is performed throughout the unit frame period, the vertical front porch length Vfp corresponding to the minimum value of the number of pixels with a signal level less than the threshold value Vt which continue from bottom end of the measurement region 64A or 64B is outputted from the measuring section 22 in a short time in the unit frame period.

The horizontal back porch length Hbp, the horizontal front porch length Hfp, the vertical back porch length Vbp and the vertical front porch length Vfp by the measuring section 22 may be measured in order, or two or more of them may be measured concurrently. In the case where they are measured concurrently, all of the horizontal back porch length Hbp, the horizontal front porch length Hfp, the vertical back porch length Vbp and the vertical front porch length Vfp can be measured in the unit frame period, so the measurement can be performed at a higher speed.

Figure 11:
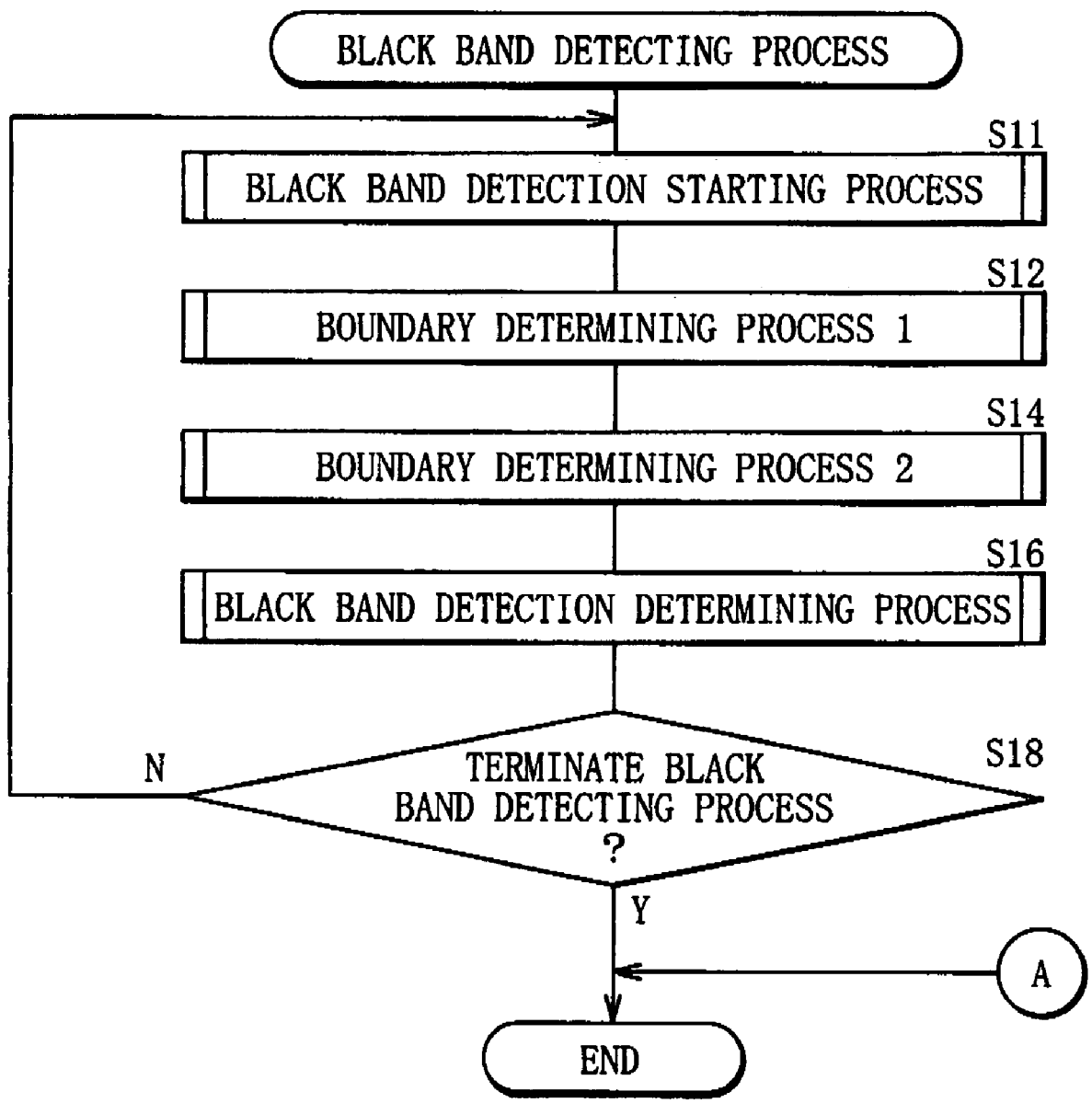
FIG. 11 is a flowchart showing a black band detecting process.

Next, referring to FIGS. 11 through 23, a black band detecting process by the black band detecting section 2 which is one of characteristic parts of the invention will be described in detail below. FIG. 11 shows a flowchart of the black band detecting process by the black band detecting section 2.

Figure 12A:
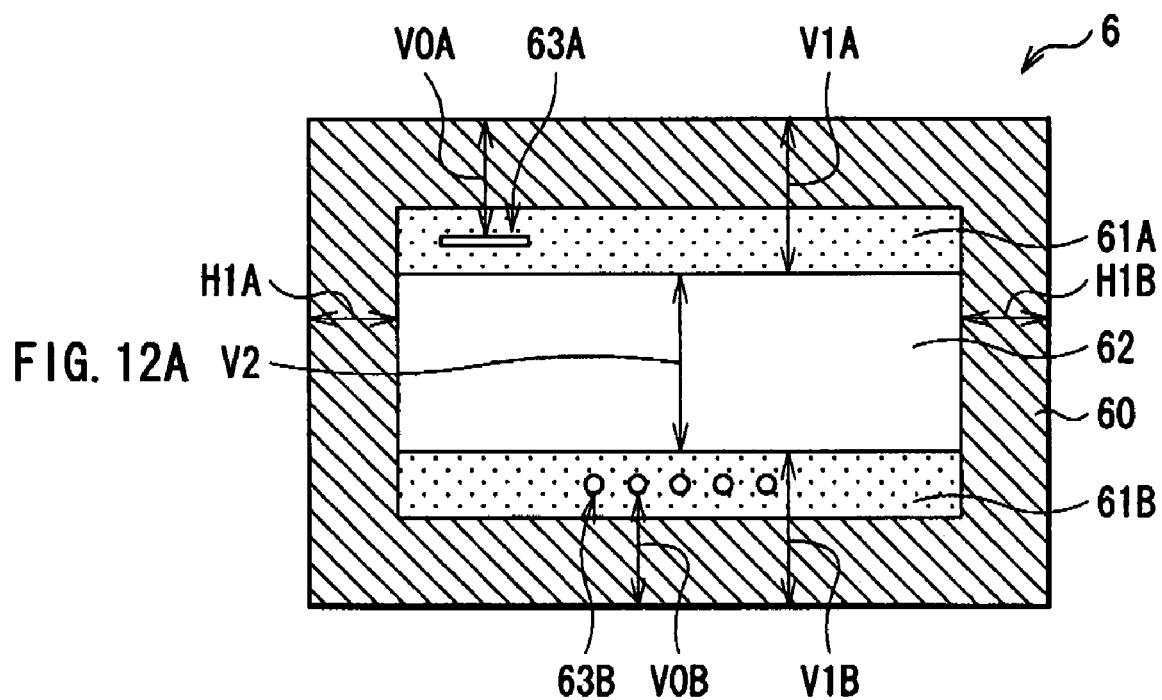
FIGS. 12A and 12B are schematic views for describing the black band detecting process.

In the black band detecting process, for example, as shown in FIG. 12A, in the case where the black band regions 61A and 61B are arranged above and below the image region 62, and the OSD 63A and the subtitles 63B are included in the black band regions 61A and 61B, the horizontal back porch length H1A and the horizontal front porch length H1B of the input image signal 6, a length V0A from the top end of the input image signal 6 to the top end of the OSD 63A and the vertical length V1A from the top of the input image signal 6 to the bottom of the black band region 61A, a length V0B from the bottom end of the input image signal 62 to the bottom end of the subtitle 63B and the vertical length V1B from the bottom of the input image signal 6 to the top of the black band region 61B, the vertical width V2 of the image region 62 and the like are detected.

Figure 12B:
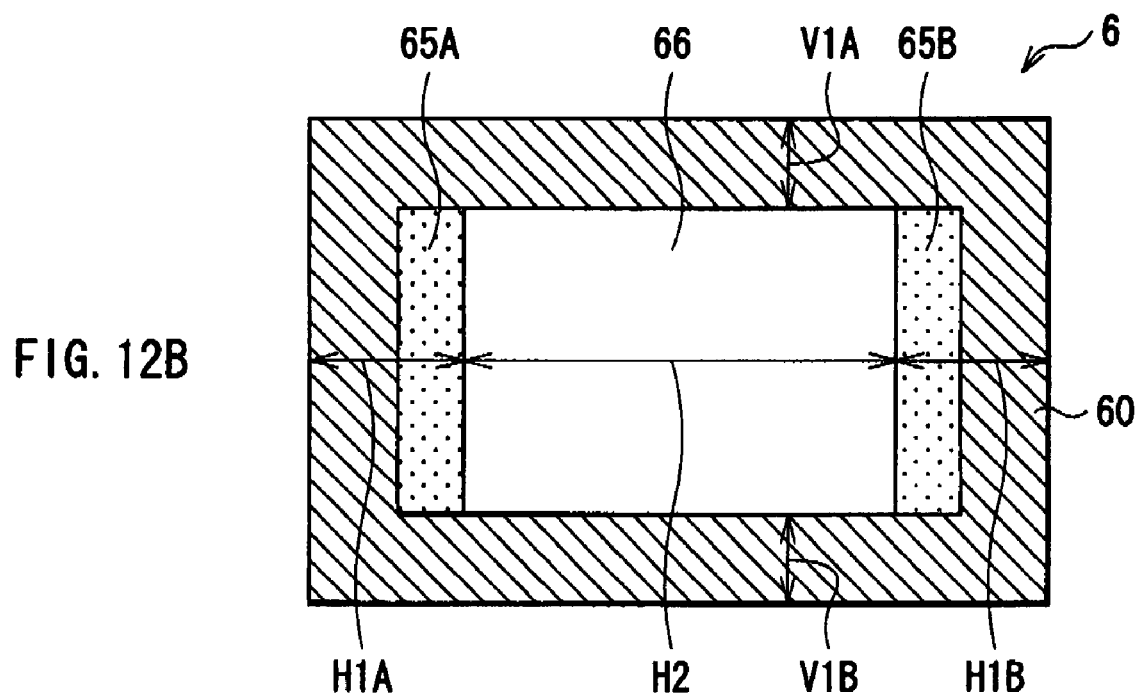
Figure 13A:
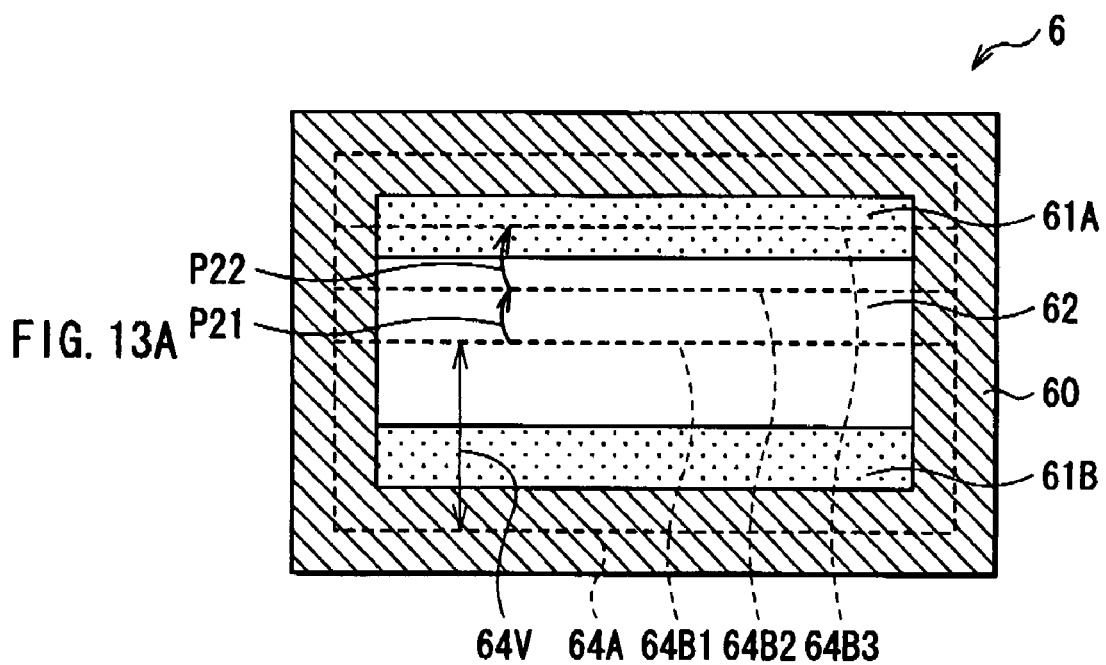
FIGS. 13A and 13B are schematic views for describing binary search of a black band region in a vertical direction.
Figure 13B:
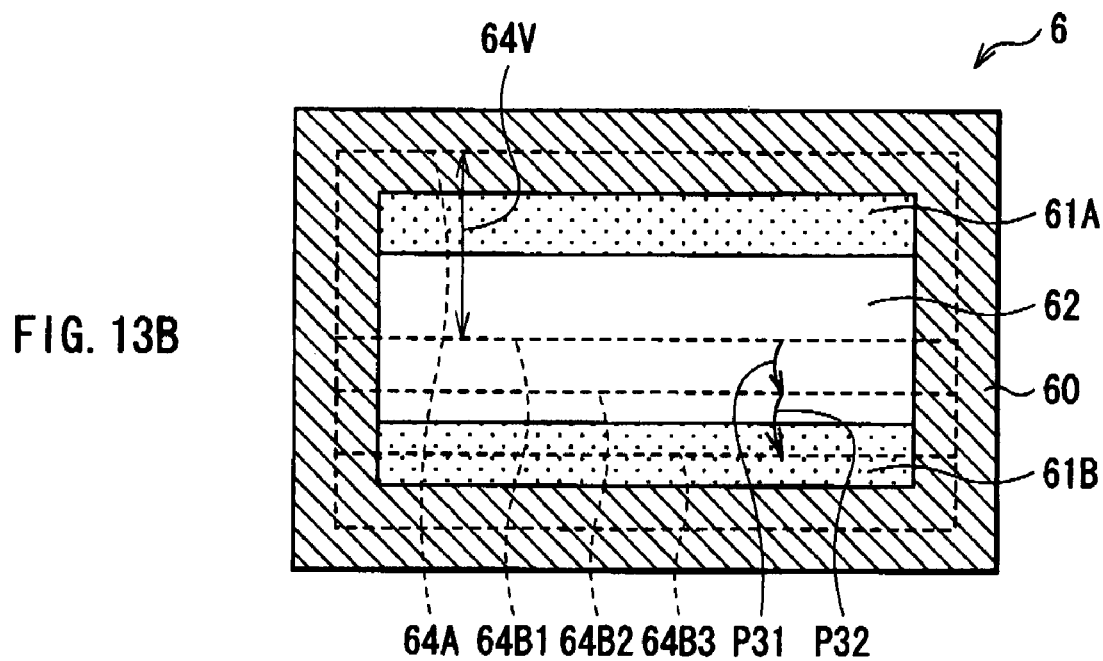
Figure 14A:
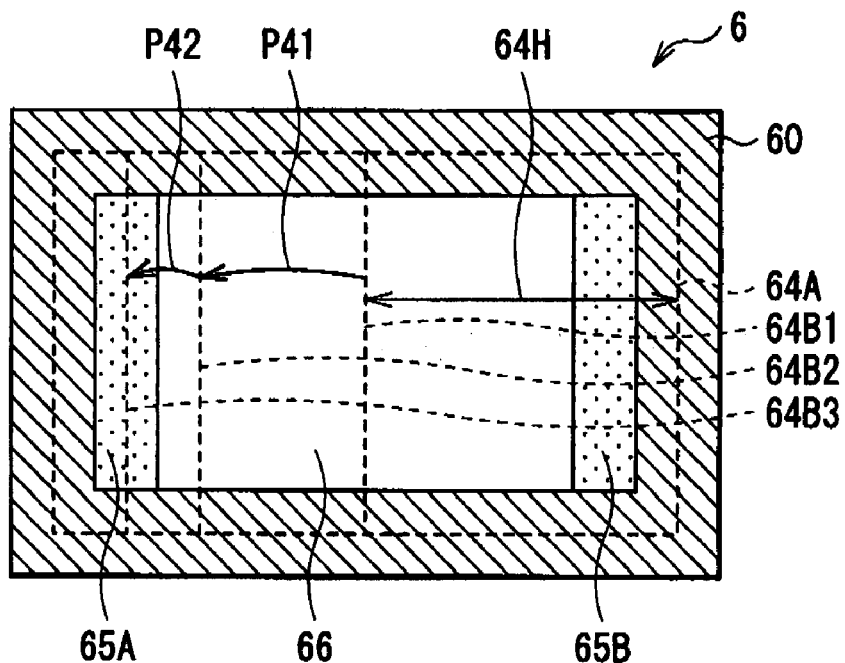
FIGS. 14A and 14B are schematic views for describing binary search of a black band region in a horizontal direction.
Figure 14B:
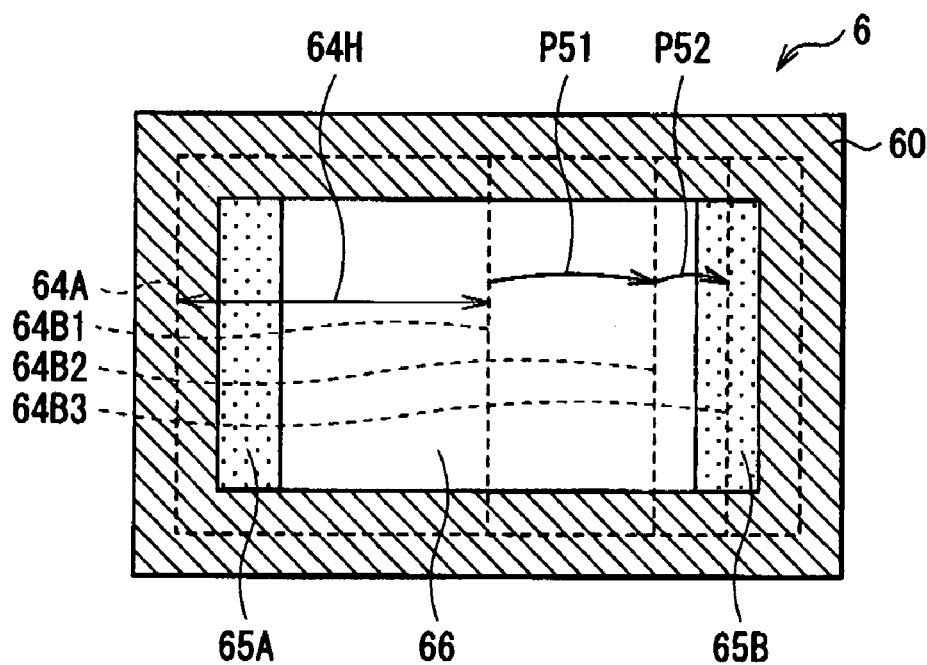

Moreover, for example, as shown in FIG. 12B, in the case where the black regions 65A and 65B are arranged on the right and the left of the image region 66, the vertical back porch length V1A and the vertical front porch length V1B of the input image signal 6, the horizontal length H1A from the left end of the input image signal 6 to the right end of the black band region 65A, the horizontal length H1B from the right end of the input image signal 6 to the left end of the black band region 65B, the horizontal width H2 of the image region 62 and the like are detected.

Further, in the black band detecting process, for example, as shown by the measurement region 64A (the basic region), measurement regions 64B1 through 64B3 and arrows P21, P22, P31, P32, P41, P42, P51 and P52 in FIGS. 13A, 13B, 14A and 14B, while the increment/decrement values 64V and 64H of the measurement regions are reset to ½ of the previous increment/decrement values, black band detection is performed. In other words, in the black band detecting process, black band detection using binary search is performed, thereby, as will be described in detail later, the black band can be detected at a high speed (in the case where the initial increment/decrement value is set to $2^n$, the black band detecting process is completed in (n+1) unit frame periods at the latest, and various parameters as shown in FIGS. 12A and 12B are outputted).

In the black band detecting process, at first, a black band detection starting process is performed (step S111).

Figure 15:
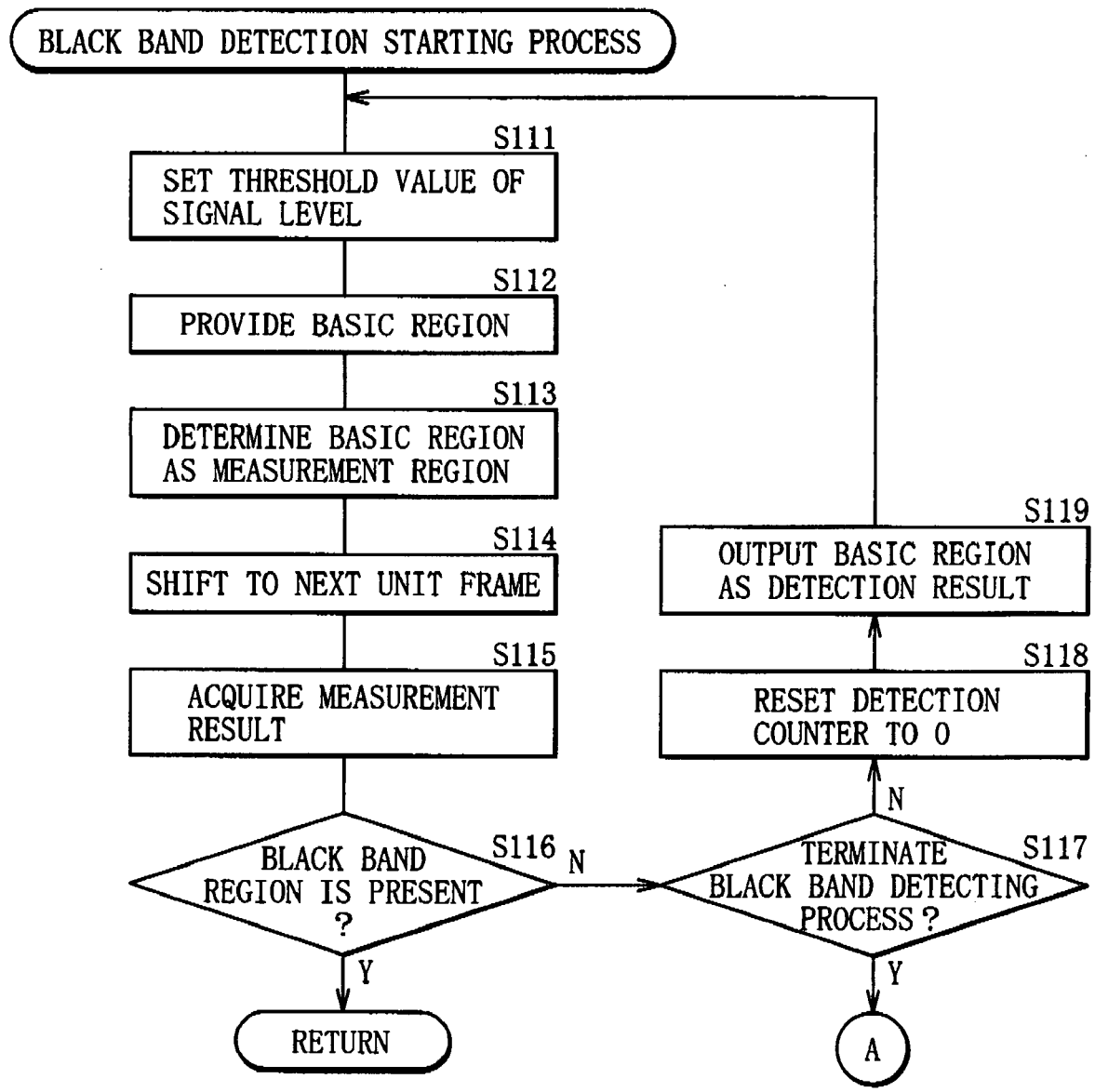
FIG. 15 is a flowchart showing the details of a black band detection starting process in FIG. 11.

More specifically, as shown in the flowchart of FIG. 15, at first, the threshold value setting section 239 sets the threshold value Vt of the signal level, and outputs the threshold value Vt to the signal level comparing section 221 (step S111 in FIG. 15). Next, on the basis of the signal type identifying result Sout, the basic region providing section 231 provides the basic region (step S112). Then, the measurement region determining section 238 determines the basic region as the measurement region 64A, and outputs the measurement region 64A to the signal level comparing section 221 (step S113).

Then, after standby until shifting to the next unit frame (step S114), the black band determining section 230 acquires the measurement result Mout (the measurement results of the horizontal back porch length Hbp, the horizontal front porch length Hfp, the vertical back porch length Vbp and the vertical front porch length Vfp in the measurement region 64A) from the measuring section 22 (step S115). Then, the black band determining section 230 determines whether a black band region is present in the measurement region 64A on the basis of the measurement result Mout (step S116), and when the presence of the black band region is determined (step S116: Y), the black band detecting process moves into the next boundary determining process 1 (step S12 in FIG. 11).

On the other hand, in the case where the absence of the black band region is determined in step S116 (step S116: N), whether the black band detection process is terminated is determined (step S117). In the case where the termination of black band detecting process is determined (step S117: Y), the black band detecting process is terminated ("END" in FIG. 11). On the other hand, in the case where it is determined that the black band detection process is not terminated, and continues (step S117: N), the detection determining section 237 resets the value of the detection number counter showing the detection number of the black band region to 0 (step S118), and the basic region 64A is outputted to the image processing section 3 as the detection result Kout (step S119). Then, the processes from step S111 to step S119 are repeated until the presence of the black band region or the termination of the black band detecting process is determined.

Next, the boundary determining process 1 is performed (step S12 in FIG. 11). More specifically, processes shown in the flowcharts of FIGS. 16 and 17 are performed.

In the boundary determining process 1, through the use of the above-described binary search technique, a boundary position between the black band region 61A on the top side or the black band region 65A on the left side and the image region 62 or the image region 66 in the input image signal 6 is determined.

Figure 16:
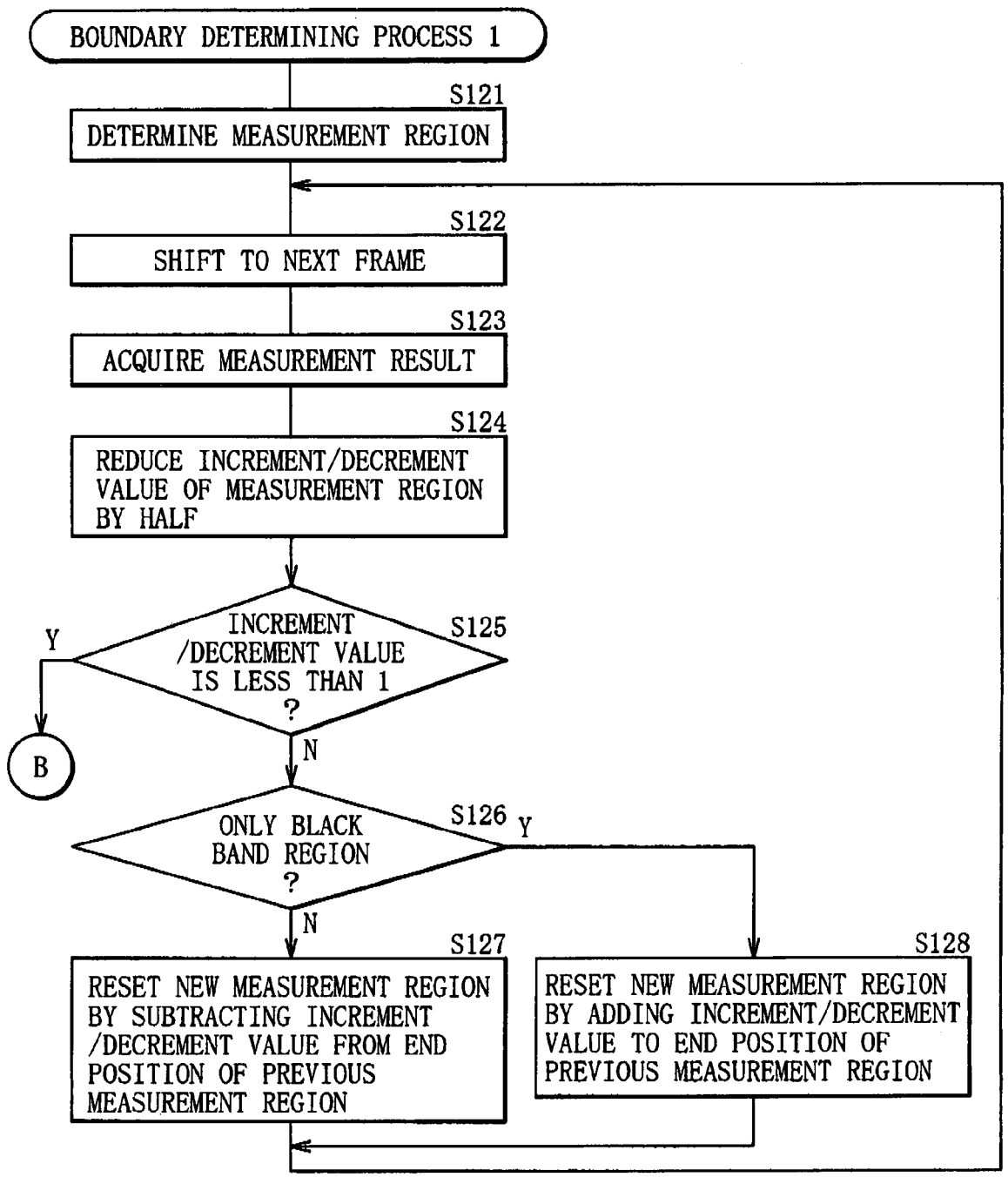
FIG. 16 is a flowchart showing the details of a boundary determining process 1 in FIG. 11.
Figure 17:
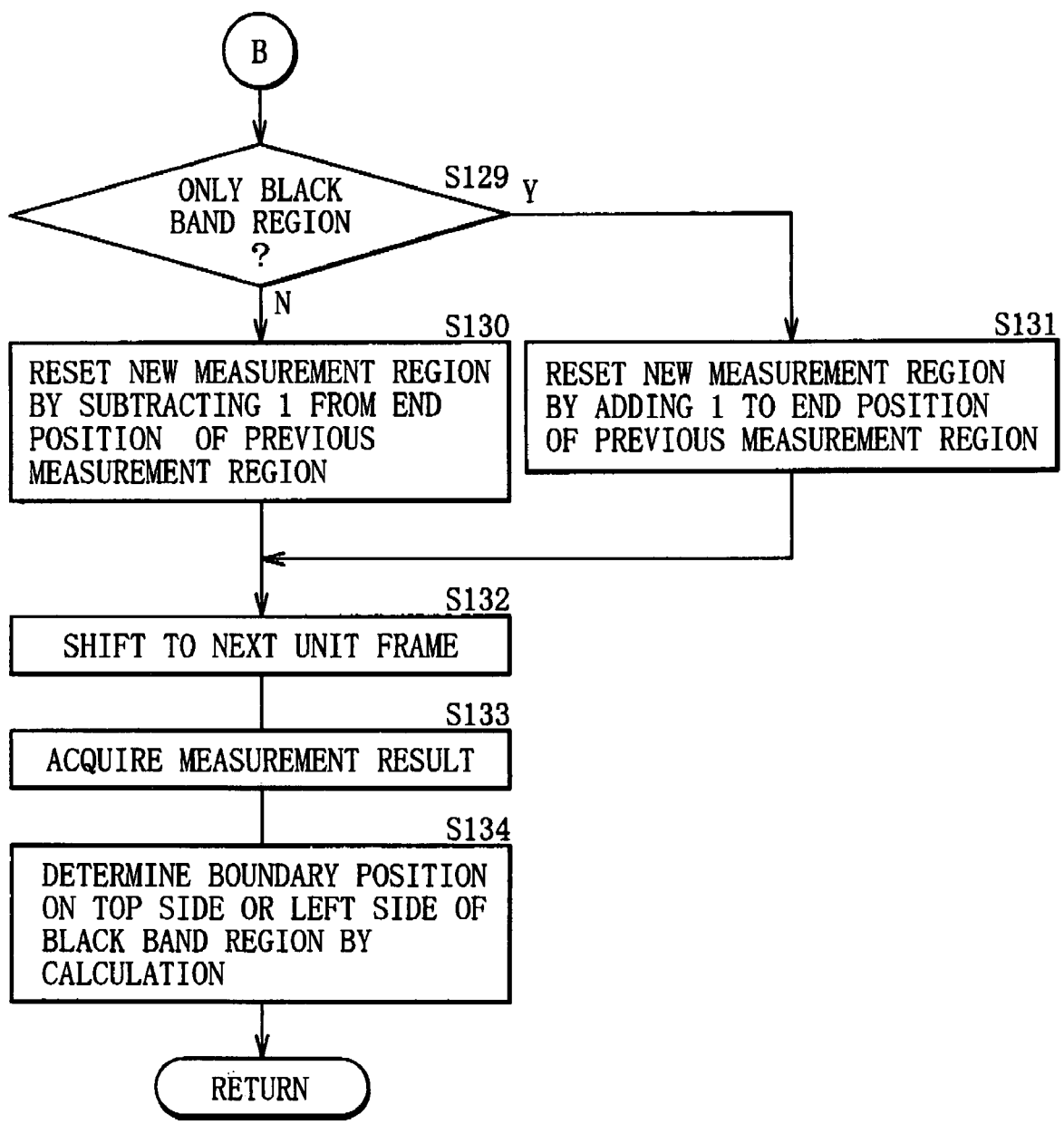
FIG. 17 is a flowchart showing the details of the boundary determining process 1 following FIG. 16.

Specifically, at first, the measurement region determining section 238 determines a first measurement region, and outputs the first measurement region to the signal level comparing section 221 (step S121 in FIG. 16). More specifically, in the case of determining the boundary position of the black band region 61A on the top side, the start position and the end position in a horizontal direction and the start position in a vertical direction in the basic region 64A are assigned to the start position and the end position in a horizontal direction and the start position in a vertical direction, and a position determined by adding an increment/decrement value in a vertical direction which is set by the initial increment/decrement value setting section 232 to a vertical start position in the basic region 64A is assigned to the end position in a vertical direction. Moreover, in the case of determining the boundary position of the black band region 65A on the left side, the start position and the end position in a vertical direction and the start position in a horizontal direction in the basic region 64A are assigned to the start position and the end position in a vertical direction and the start position in a horizontal direction, and a position determining by adding an initial increment/decrement value in a horizontal direction which is set by the initial increment/decrement value setting section 232 to a horizontal start position in the basic region 64A is assigned to the end position in a horizontal direction. The initial increment/decrement values in a horizontal direction and a vertical direction are set on the basis of the signal type identifying result Sout, and in the boundary determining process 1, the boundary position on the top side or the left side is determined, so it is desirable to set the initial increment/decrement values to ½ or less of the widths in a horizontal direction and a vertical direction of the basic region 64A, because the boundary position of the black band region can be determined in a shorter time.

Next, after standby until shifting to the next unit frame (step S122), the black band determining section 230 acquires the measurement result Mout from the measuring section 22 (step S123). Then, the increment/decrement value providing section 233 reduces the increment/decrement value of the measurement region by half. In other words, the increment/decrement value is reset to ½ of the increment/decrement value of the previous measurement region as a new increment/decrement value. Next, the increment/decrement value providing section 233 determines whether the new increment/decrement value set in such a manner is less than 1 (step S125), and in the case where the increment/decrement value is less than 1 (step S125: Y), it is determined that it is not necessary to use the binary search technique any more, and the black band detecting process moves into the next process (step S129 of FIG. 17).

On the other hand, in the case where it is determined that the new increment/decrement value is not less than 1 in step S125 (step S125: N), the black band determining section 230 determines whether only the black band region (the black band region including the blanking region 60) is present in the measurement region 64B on the basis of the measurement result Mout (step S126). Then, according to the determination result, the measurement region determining section 238 resets a new measurement region by adding or subtracting the increment/decrement value of a new measurement zone provided by the increment/decrement value providing section 233 in step S124 to or from the previous measurement region (steps S127 and S128).

Figure 18A:
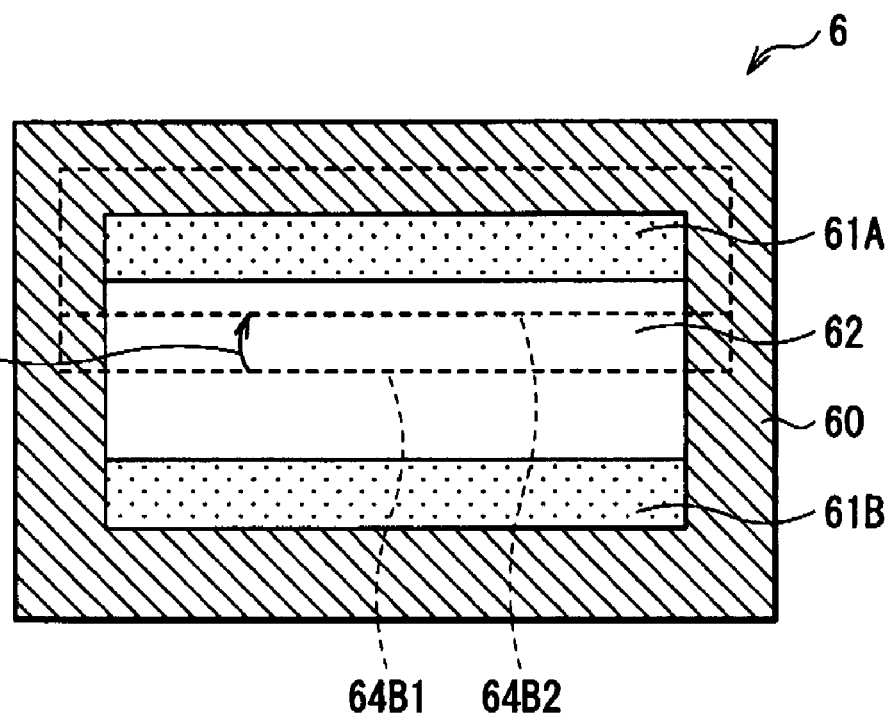
FIGS. 18A and 18B are schematic views for describing the boundary determining process 1.
Figure 18B:
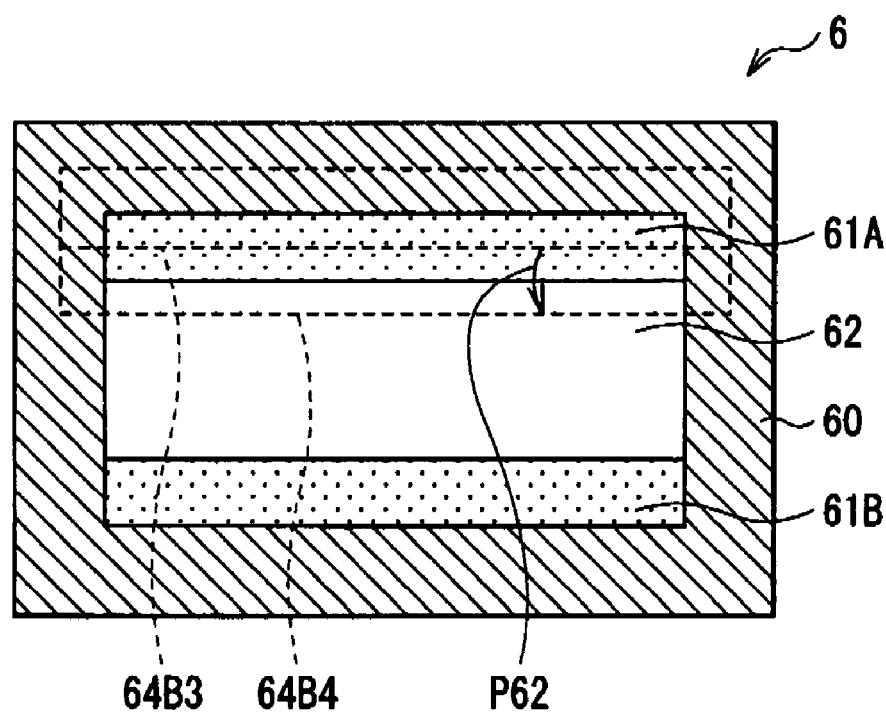

More specifically, for example, as shown in FIG. 18A, in the case where in addition to the black band region, the image region 62 is present in a measurement region 64B1 (step S126: N), as shown by an arrow P61 in the drawing, a new measurement region 64B2 is reset by subtracting a new increment/decrement value from the end position of the previous measurement region 64B1 (step S127). On the other hand, for example, as shown in FIG. 18B, in the case where only the black band region is present in a measurement region 64B3 (step S126: Y), as shown by an arrow P62 in the drawing, a new measurement region 64B4 is reset by adding a new increment/decrement value to the end position of the previous measurement region 64B3 (step S128). After steps S127 and S128, until it is determined that a new increment/decrement value is less than 1 in step S125, that is, the boundary position between the black band region and the image region is detected (step S125: Y), the processes from step S122 to step S127 or S128 are repeated. In addition, FIGS. 18A and 18B show the case of determining the boundary position of the black band region 61A on the top side; however, the same processes are performed in the case of determining the boundary position of the black band region 65A on the left side.

Next, as in the case of step S126, on the basis of the measurement result Mout, the black band determining section 230 determines whether only the black band region is present in the measurement region 64B (step S129 in FIG. 17). In the case where it is determined that only the black band region is not present (step S129: N), as in the case of step S127, a new measurement region is reset by subtracting a new increment/decrement value from the end position of the previous measurement region (step S130). On the other hand, in the case where it is determined that only black band region is present (step S129: Y), as in the case of step S128, a new measurement region is reset by adding a new increment/decrement value to the end position of the previous measurement region (step S131).

Next, after standby until shifting to the next unit frame (step S132), the black band determining section 230 acquires the measurement result Mout from the measuring section 22 (step S133). Then, the boundary determining section 234 determines the boundary position on the top side or the left side of the black band region at this time by calculation (step S134), and outputs the boundary position to the detection determining section 237, thereby the boundary determining process 1 is terminated, and the black band detecting process moves into the next process.

Next, a boundary determining process 2 is performed (step S14 in FIG. 11). More specifically, processes shown in the flowcharts of FIGS. 19 and 20 are performed.

In the boundary determining process 2, basically as in the case of the above-described boundary determining process 1, the boundary position between the black band region 61B on the bottom side or the black band region 65B on the right side and the image region 62 or the image region 66 in the input image signal 6 is determined.

Figure 19:
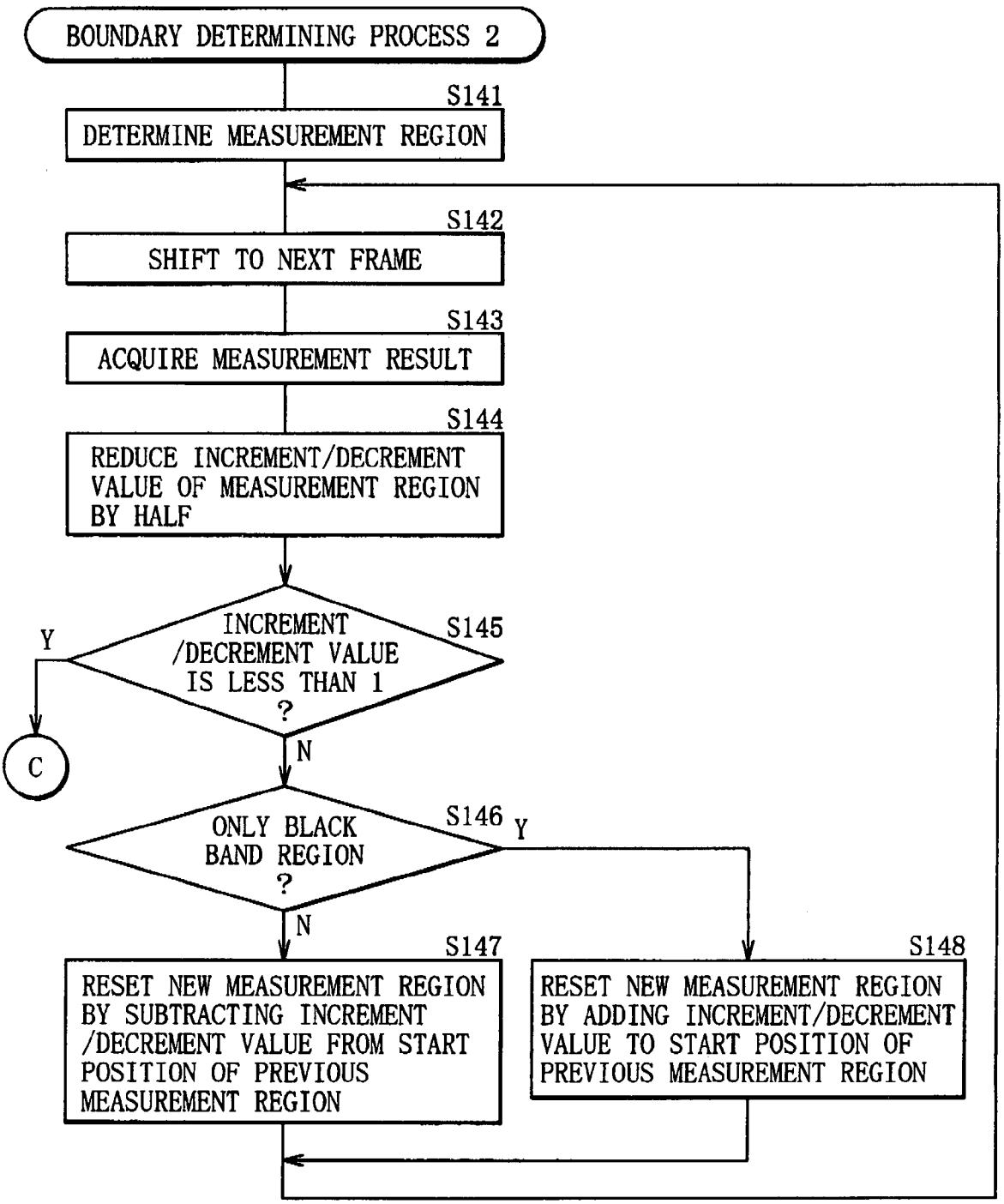
FIG. 19 is a flowchart showing the details of a boundary determining process 2 in FIG. 11.
Figure 20:
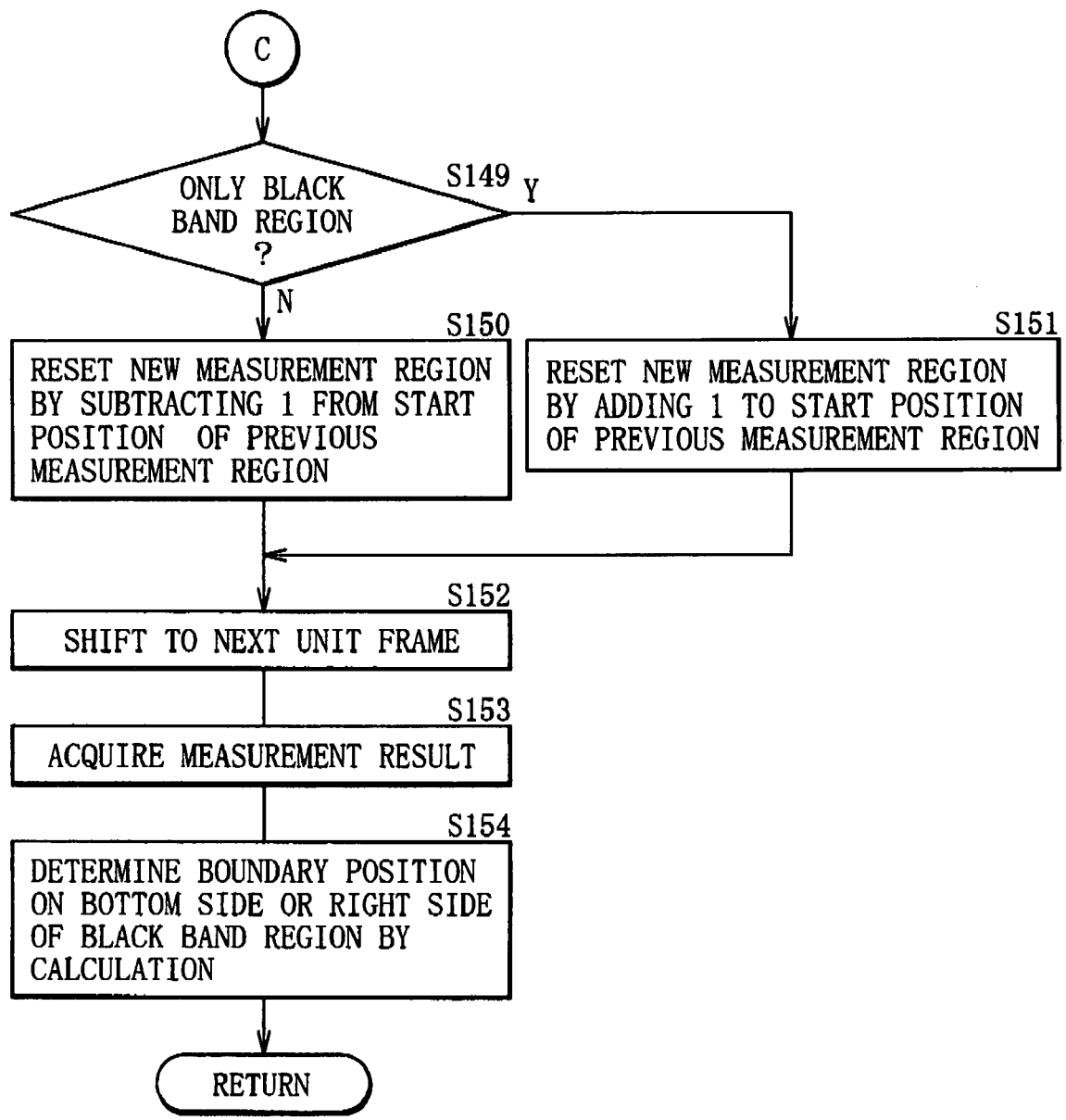
FIG. 20 is a flowchart showing the details of the boundary determining process 2 following FIG. 19.

Specifically, at first, the measurement region determining section 238 determines a first measurement region, and outputs the first measurement region to the signal level comparing section 221 (step S141 in FIG. 19). More specifically, in the case of determining the boundary position of the black band region 61B on the bottom side, the start position and the end position in a horizontal direction and the end position in a vertical direction in the basic region 64A are assigned to the start position and the end position in a horizontal direction and the end position in a vertical direction, and a position determined by subtracting the initial increment/decrement value in a vertical direction which is set by the initial increment/decrement value setting section 232 from the vertical end position of the basic region 64A is assigned to the start position in a vertical direction. Moreover, in the case of determining the boundary position of the black band region 65B on the right side, the start position and the end position in a vertical direction and the end position in a horizontal direction in the basic region 64A are assigned to the start position and the end position in a vertical direction and the end position in a horizontal direction, and a position determined by subtracting the initial increment/decrement value in a horizontal direction which is set by the initial increment/decrement value setting section 232 from the horizontal end position of the basic region 64A is assigned to the start position in a horizontal direction.

Next, in following steps S142 through S153, the same processes as those in step S122 through S133 of the boundary determining process 1 are performed. However, in steps S147 and S150, for example, as shown by an arrow P71 in FIG. 21A, a new measurement region 64B2 is reset by subtracting a new increment/decrement value or 1 from the start position of the previous measurement region 64B1 (steps S147 and S150). Moreover, in steps S148 and S151, for example, as shown by an arrow P72 in FIG. 21B, a new measurement region 64B4 is reset by adding a new increment/decrement value or 1 to the start position of the previous measurement region 64B3 (steps S148 and S151).

Figure 21A:
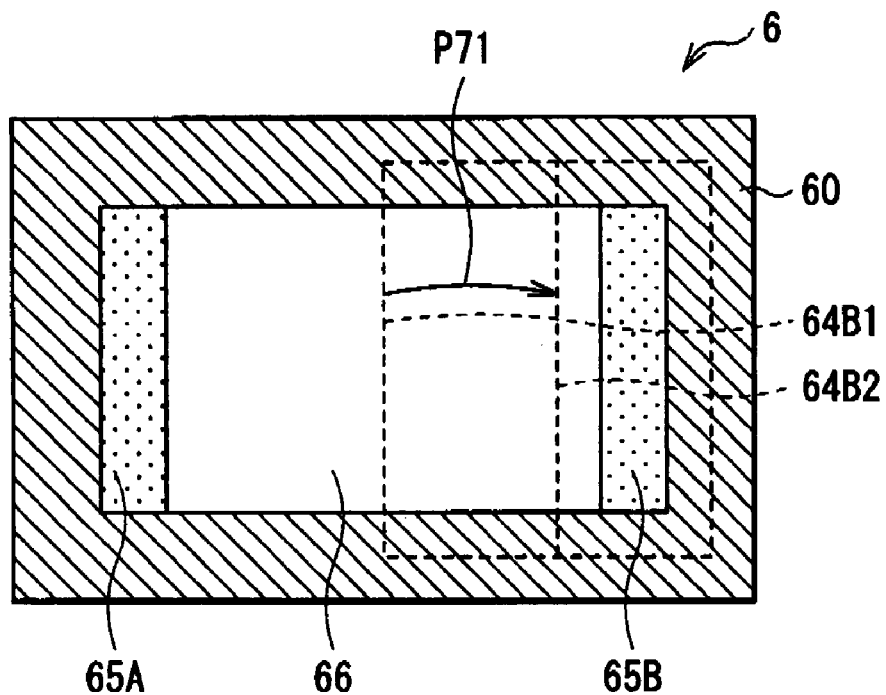
FIGS. 21A and 21B are schematic views for describing the boundary determining process 2.
Figure 21B:
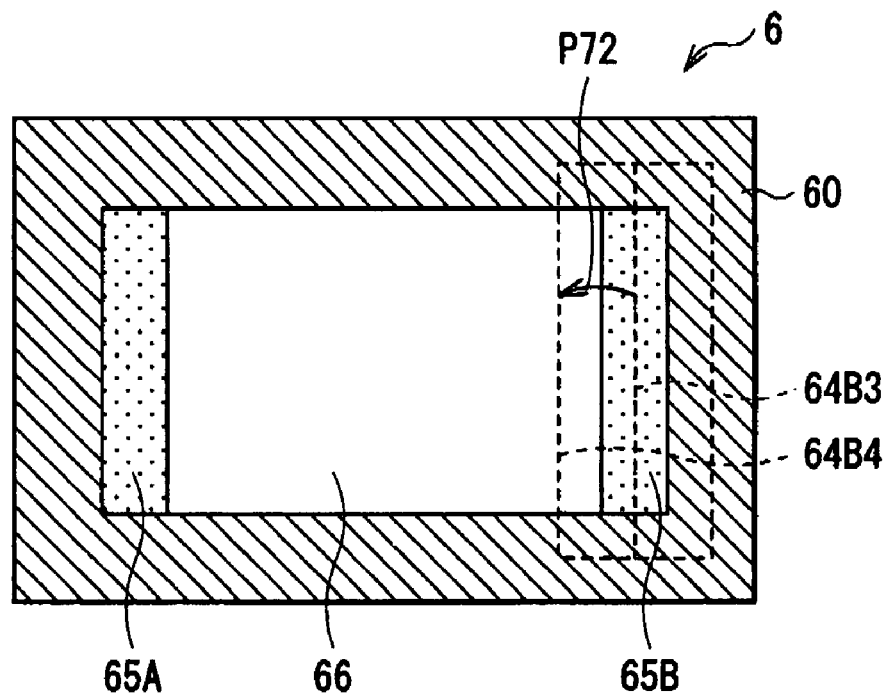

Then, the boundary determining section 234 determines the boundary position on the bottom side or the right side of the black band region by calculation, and outputs the boundary position to the detection determining section 237 in step S154 in FIG. 20, thereby the boundary determining process 2 is terminated, and the black band detecting process moves into the next process. In addition, FIGS. 21A and 21B show the case of determining the boundary position of the black band region 65B on the right side; however, the same process is performed in the case of determining the boundary of the black band region 61B on the bottom side.

Next, a black band detection determining process is performed (step S16 in FIG. 11). More specifically, processes shown in flowcharts in FIGS. 22 and 23 are performed.

Figure 22:
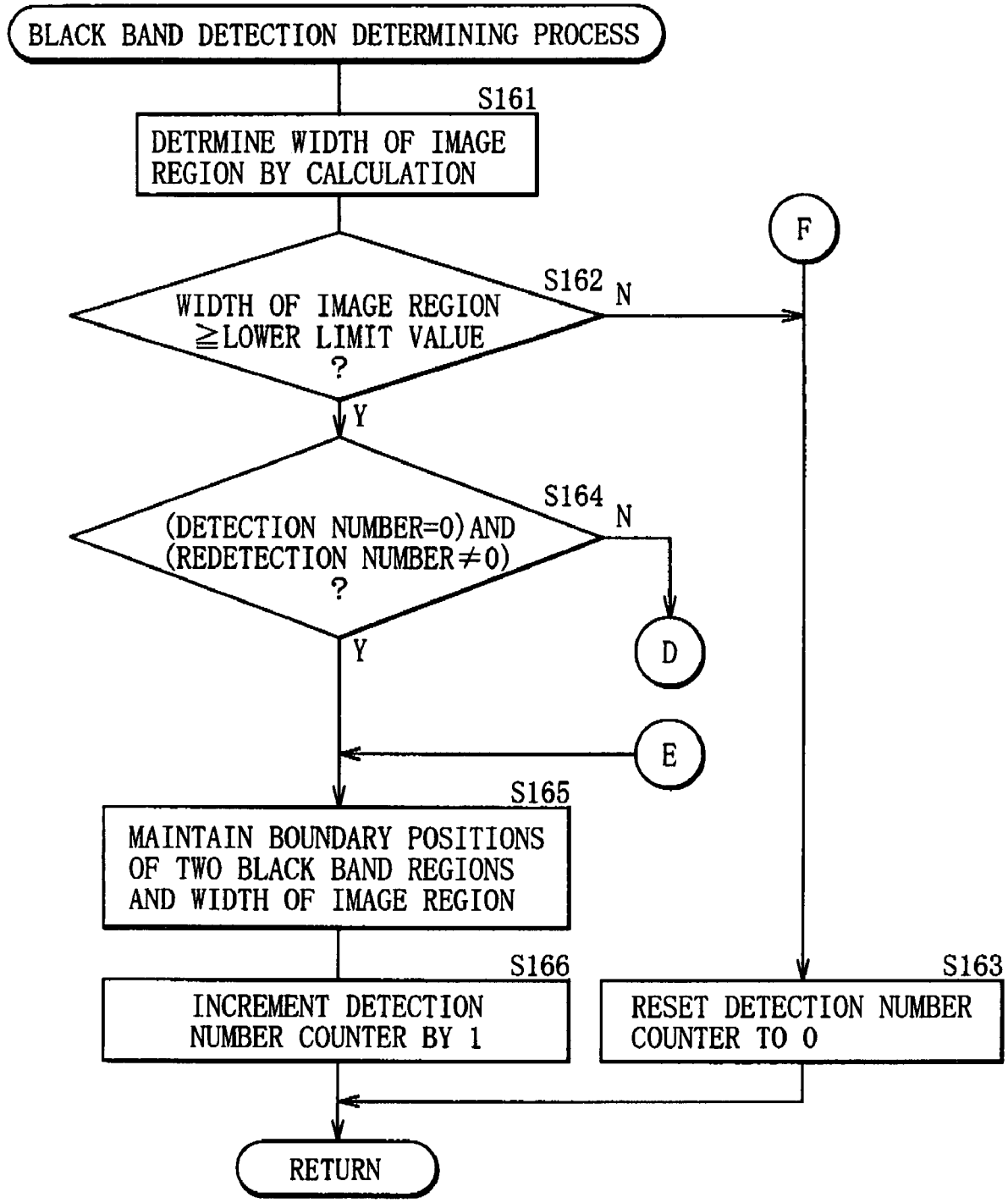
FIG. 22 is a flowchart showing the details of a black band detection determining process in FIG. 11.
Figure 23:
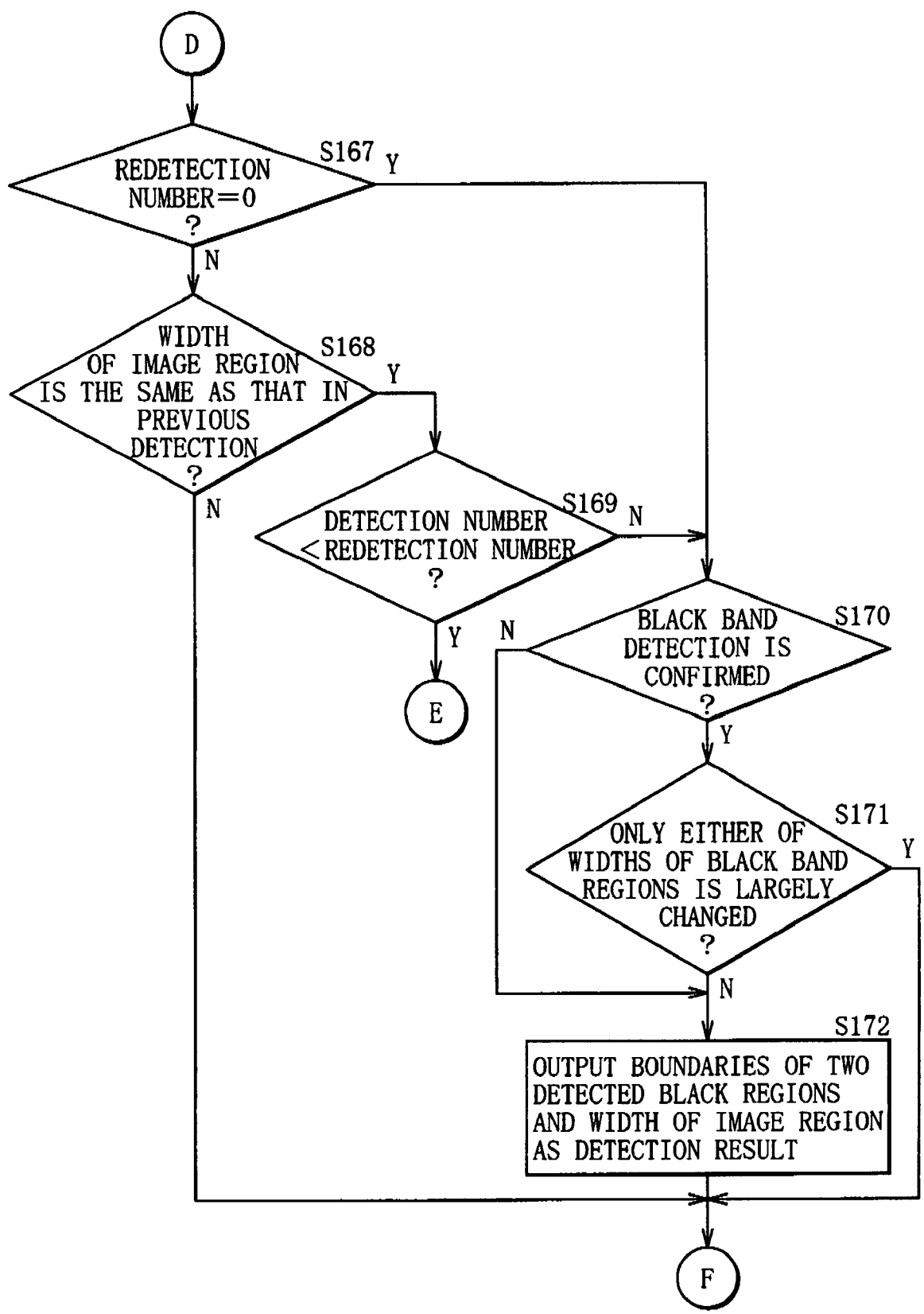
FIG. 23 is a flowchart showing the details of the black band detection determining process following FIG. 22.

At first, the detection determining section 237 determines the width (the vertical width V2 or the horizontal width H2) of the image region 62 by calculation on the basis of the boundary positions of the black band regions 61A and 61B or the black band regions 65A and 65B determined in the boundary detecting processes 1 and 2 by the boundary determining section 234, and the resolution of the input image signal 6 obtained by the signal type identifying result Sout (step S161 in FIG. 22). Next, the detection determining section 237 determines whether the width of the image region 62 is equal to or larger than the lower limit value set by the lower limit value setting section 236 (step S162).

In the case where it is determined that the width is less than the lower limit value (step S162: N), it is determined that it is because the image region 62 is a dark scene or the like, and to prevent false detection of the black band region, the value of the detection number counter of the black band region is reset to 0 (step S163). Then, except for the case where the black band detection determining process is terminated ("return"), and the whole black band detecting process is terminated in step S18 in FIG. 11 (step S18: Y), the black band detecting process returns to the black band detection starting process (step S11), and starts from the beginning.

On the other hand, in the case where it is determined that the width is equal to or larger than the lower limit value (step S162: Y), the detection determining section 237 determines whether conditional expressions (the value of the detection number counter=0) and (the redetection number set by the redetection number setting section 235≠0) are satisfied (step S164). In the case where it is determined that the conditional expressions are satisfied (step S164: Y), since this is the first black band detection, the detection result is not able to be compared with the previous detection result. Therefore, the boundary positions of two detected black band regions (on the top and bottom sides or on the right and left sides) and the width of the image region 62 are maintained as it is (step S165), and the value of the detection number counter is incremented by one, thereby except for the case where the black band detection determining process is terminated ("return"), and the whole black band detecting process is terminated in step S18 in FIG. 11 (step S18: Y), the black band detecting process returns to the black band detection starting process (step S11) and is performed again.

On the other hand, in the case where the conditional expressions in step S164 are not satisfied (step S164: N), the detection determining section 237 determines whether the redetection number is set to 0 (step S167 in FIG. 23). In the case where it is determined that the redetection number is set to 0 (step S167: Y), except for the case where it is determined that the black band detection is confirmed (step S170: Y), the boundary positions of two detected black band regions (on the top and bottom sides or on the right and left sides) and the width of the image region 62 are outputted to the image processing section 3 as it is as the black band detection result Kout (step S172), and the value of the detection number counter is reset to 0 (step S163), thereby except for the case where the black band detection determining process is terminated ("return"), and the whole black band detecting process is terminated in step S18 in FIG. 11 (step S18: Y), the black band detecting process returns to the black band detecting starting process (step S11), and is performed again.

Moreover, in the case where it is determined in step S170 that the black band detection is confirmed (step S170: Y), the detection determining section 237 determines whether the width of the black band region is changed, and in the case where the width is changed, the detection determining section 237 determines whether only either of the widths of two black band detection regions is largely changed (step S171). In the case where only one of them is largely changed (step S171: Y), it is determined the image region 62 is a dark scene or the like, and to prevent false detection of the black band region, the value of the detection number counter of the black band region is reset to 0 (step S163), thereby the black band detection determining process is terminated without outputting the black band detection result Kout ("return"). On the other hand, in the case where it is determined that not only one of them is largely changed (step S171: N), the process moves into step S172, and the black band detection result Kout is outputted (step S172), and the value of the detection number counter of the black band region is set to 0 (step S163), thereby the black band detection determining process is terminated ("return").

In the case where it is determined in step S167 that the redetection number is set to a value except for 0 (a value of 1 or more) (step S167: N), the detection number of the black band region is 1 or more, so the detection determining section 237 determines whether the width of the image region 62 in the previous detection matches the width of the image region 62 in this detection (step S168). In the case where they do not match each other (step S168: N), there is high possibility of false detection, so to prevent such false detection, the value of the detection number counter of the black band region is reset to 0 (step S163), thereby the black band detection determining process is terminated without outputting the black band detection result Kout ("return"). On the other hand, in the case where it is determined that they match each other (step S168: Y), the detection determining section 237 determines whether the value of the detection number counter is less than the set redetection number (step S169). In the case where it is determined that the value is less than the redetection number (step S169: Y), the boundary positions of two detected black band regions and the width of the image region 62 are maintained as it is (step S165), and the value of the detection number counter is incremented by one, thereby the black band detection determining process is terminated ("return"), and except for the case where the whole black band detecting process is terminated in step S18 in FIG. 11 (step S18: Y), the black band detecting process returns to the black band detection starting process (step S11), and is performed again.

On the other hand, in the case where the value is not less than the redetection number (that is, the value is equal to the redetection number) in step S169 (step S169: N), the process moves into steps S170 through S172, and the black band detection result Kout is outputted as described above, and whether the black band detection determining process is terminated is determined.

As described above, when the black band detection determining process is terminated, whether the whole black band detecting process is terminated is determined in step S18, and in the case where the process is not terminated (step S18: N), processes of step S11 through S16 are repeated, and in the case where the process is terminated (step S18: Y), the whole black band detecting process is terminated.

Figure 24:
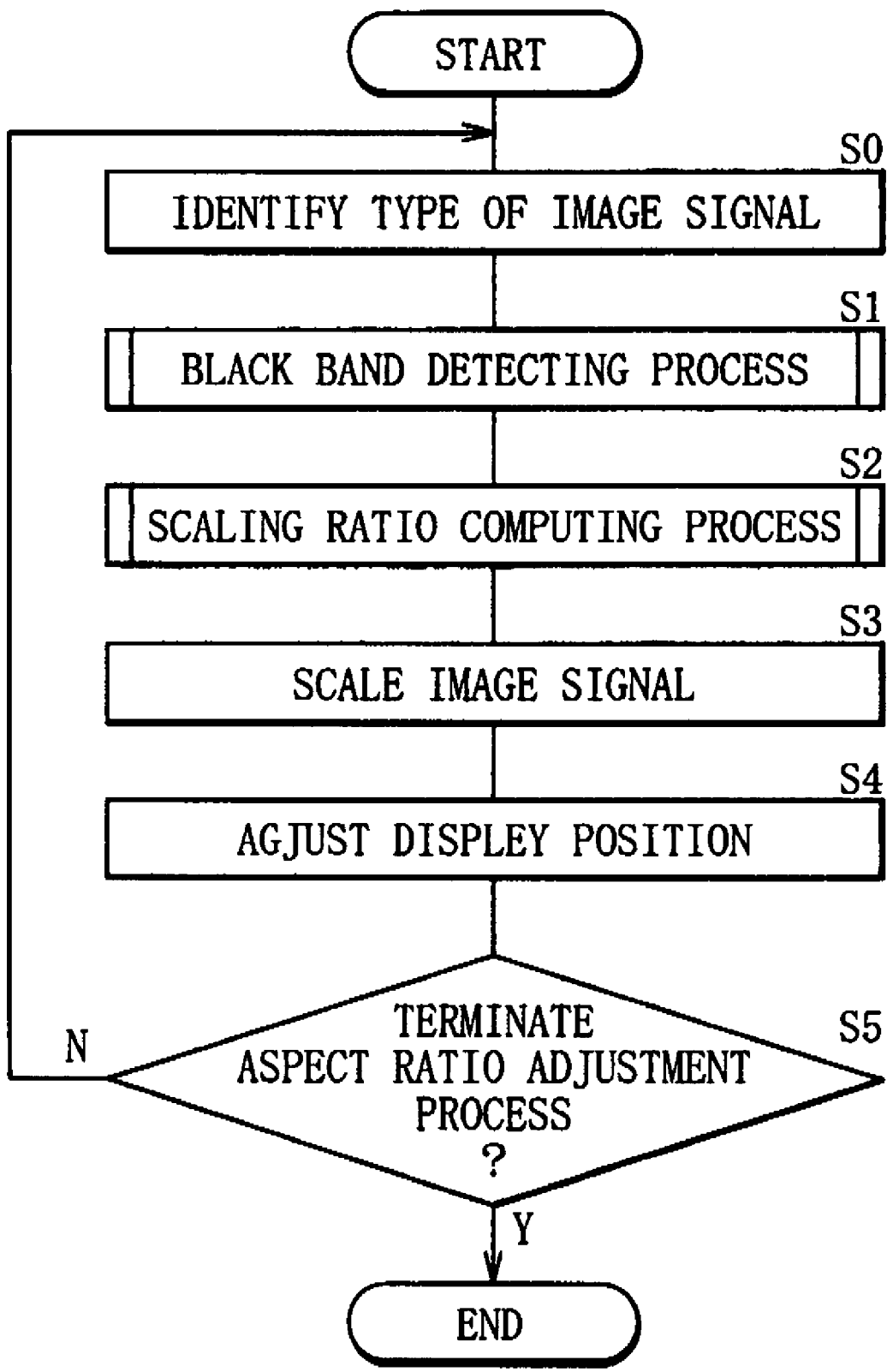
FIG. 24 is a flowchart showing an aspect ratio adjustment process on an input image signal.

Next, referring to FIGS. 24 through 28, the aspect ratio adjustment process including the above-described black band detecting process on the input image signal in the black band detecting section 2 and the image processing section 3 will be described in detail as one of characteristic parts of the invention. FIG. 24 shows a flowchart of the aspect adjustment process.

At first, the signal type identifying section 211 in the black band detecting section 2 identifies the type of the input image signal 6 (step S0), and outputs the identifying result Sout to the detecting section 23 and the computing section 31 in the image processing section 3.

Next, the black band detecting section 2 performs a series of black band detecting processes S11 through S18 shown in FIG. 11 (and FIGS. 12A and 12B through 23) on the basis of the signal type identifying result Sout and the luminance signal Yin of the input image signals (step S11), and outputs the black band detection result Kout to the computing section 31.

Figure 25A:
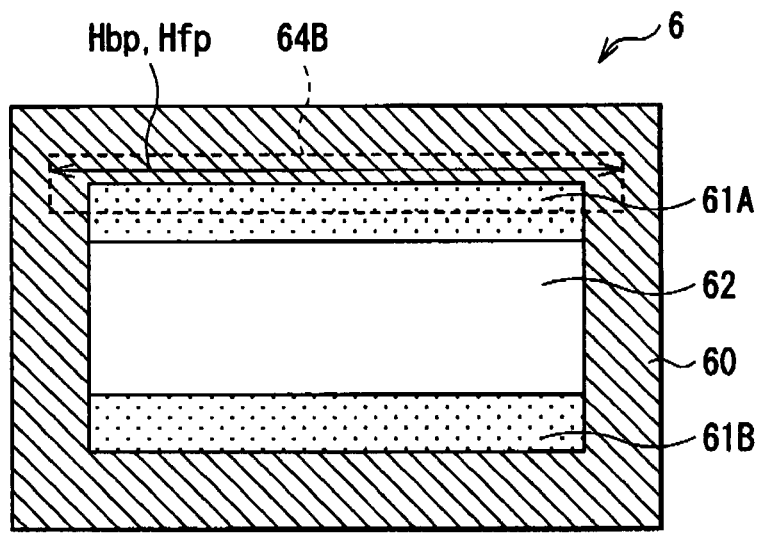
FIGS. 25A, 25B and 25C are schematic views for describing a process of determining whether only a black band is present in a measurement region.
Figure 25B:
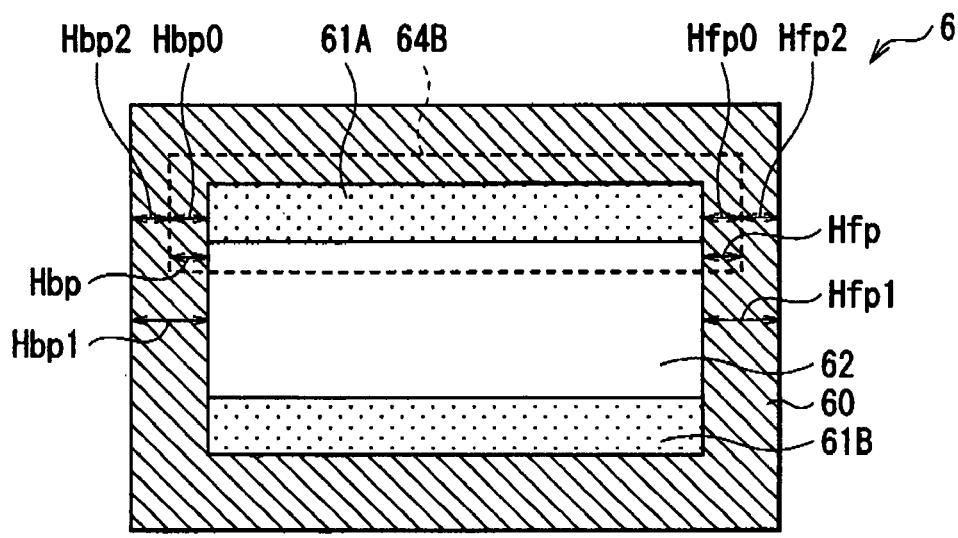
Figure 25C:
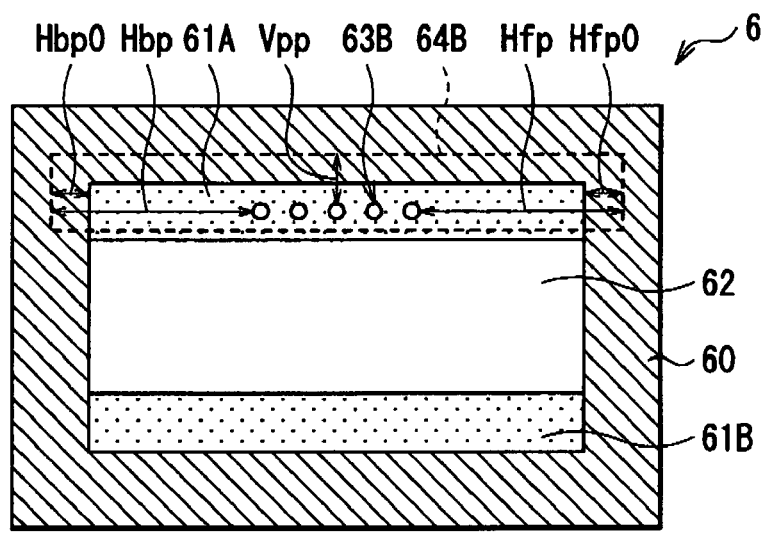

In this case, in the black band detecting process S1, in steps S126, S129, S146 and S149 in the boundary determining processes 1 and 2 shown in FIGS. 16, 17, 19 and 20, when whether only the black band region including the blanking region 60 is present in the measurement region 64B is determined, it is determined, for example, as shown in FIGS. 25A, 25B and 25C. In other words, for example, as shown in the drawings, when determining whether only the black band region 61A (including the blanking region 60) is present on the top side of the image region 62, it is determined also by using the values of the horizontal back porch length Hbp and the horizontal front porch length Hfp.

More specifically, for example, as shown in FIG. 25A, in the case where both of the horizontal back porch length Hbp and the horizontal front porch length Hfp match the width in a horizontal direction of the measurement region 64B (in this case, the width in a horizontal direction of the basic region 64A), it is determined that the image region 62 or subtitles or the like in the black band region are not present in the measurement region 64B, and only the black band region is present.

Moreover, for example, as shown in FIG. 25B, in the case where the image region 62 is present in the measurement region 64B, the presence or absence of the image region 62 is determined depending on whether the horizontal back porch length Hbp and the horizontal front porch length Hfp by the measurement result match a preset horizontal back porch length Hbp0 and a preset horizontal front porch length Hfp0. More specifically, when at least either the horizontal back porch length Hbp and the horizontal back porch length Hbp0, or the horizontal front porch length Hfp and the horizontal front porch length Hfp0 match each other, it is determined that the image region 62 is present. As shown in FIG. 25B, the horizontal back porch length Hbp0 is determined by a difference between a horizontal length Hbp1 determined by the type of the input image signal and a horizontal length Hbp2 determined at the time of determining the measurement region 64B (Hbp0=Hbp1−Hbp2), and the horizontal front porch length Hfp0 is determined by a difference between a horizontal length Hfp1 determined by the type of the input image signal and a horizontal length Hfp2 determined at the time of determining the measurement region 64B (Hfp0=Hfp1−Hfp2).

Moreover, for example, as shown in FIG. 25C, in the case where the image region 62 is not present in the measurement region 64B (only the black band region 61A is present), but the subtitles 63B are present in the black band region 61A, the horizontal back porch length Hbp and the horizontal front porch length Hfp by the measurement result are large, compared to the preset horizontal back porch length Hbp0 and the preset horizontal front porch length Hfp0, so it is basically determined that the image region 62 is not present. It is because when it is determined that an image region including the region of the subtitles 63B is present, at the time of adjusting the aspect ratio which will be described later, the aspect ratio is wrongly adjusted. However, not to miss the subtitles 63B, the positions of the subtitles 63B are detected by using the vertical back porch length Vbp or the vertical front porch length Vfp by the measurement result (in the case of FIG. 25C, by using the vertical back porch length vbp) in addition to the horizontal back porch length Hbp and the horizontal front porch length Hfp by the measurement result. In addition, the subtitles 63B are displayed or not depending on the unit frame, so the smallest value of the vertical back porch length Vbp or the vertical front porch length Vfp until confirming the detection by the black band detecting process is considered as the positions of the subtitles 63B.

Thus, when whether only the black band region including the blanking region 60 is present in the measurement region 64B is determined, it is determined also by using the value of the horizontal back porch length Hbp or the horizontal front porch length Hfp, so in addition to the presence of the image region 62, the presence or absence of the subtitles 63B in the black band region can be determined.

Figure 26:
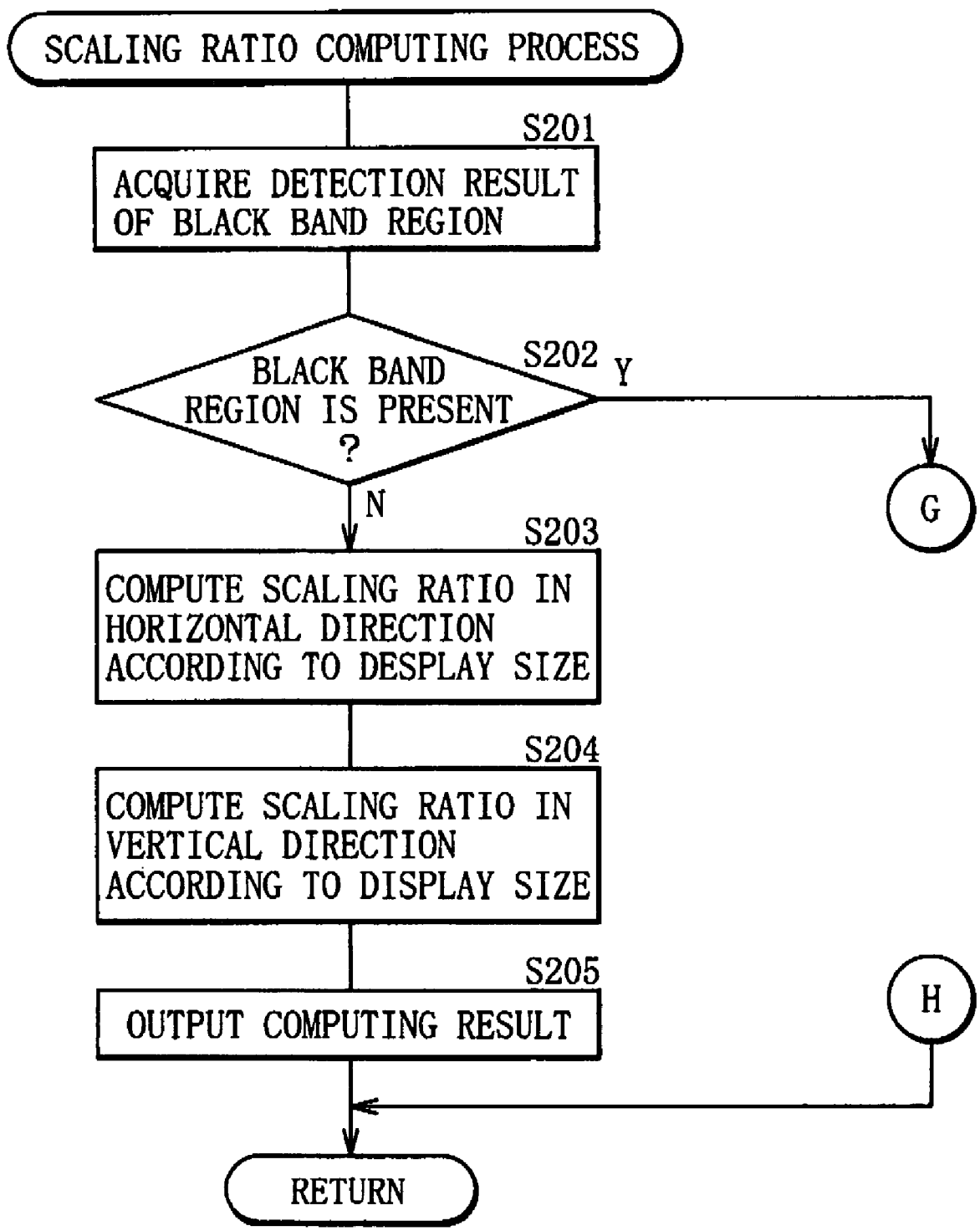
FIG. 26 is a flowchart showing the details of a scaling ratio computing process in FIG. 24.
Figure 27:
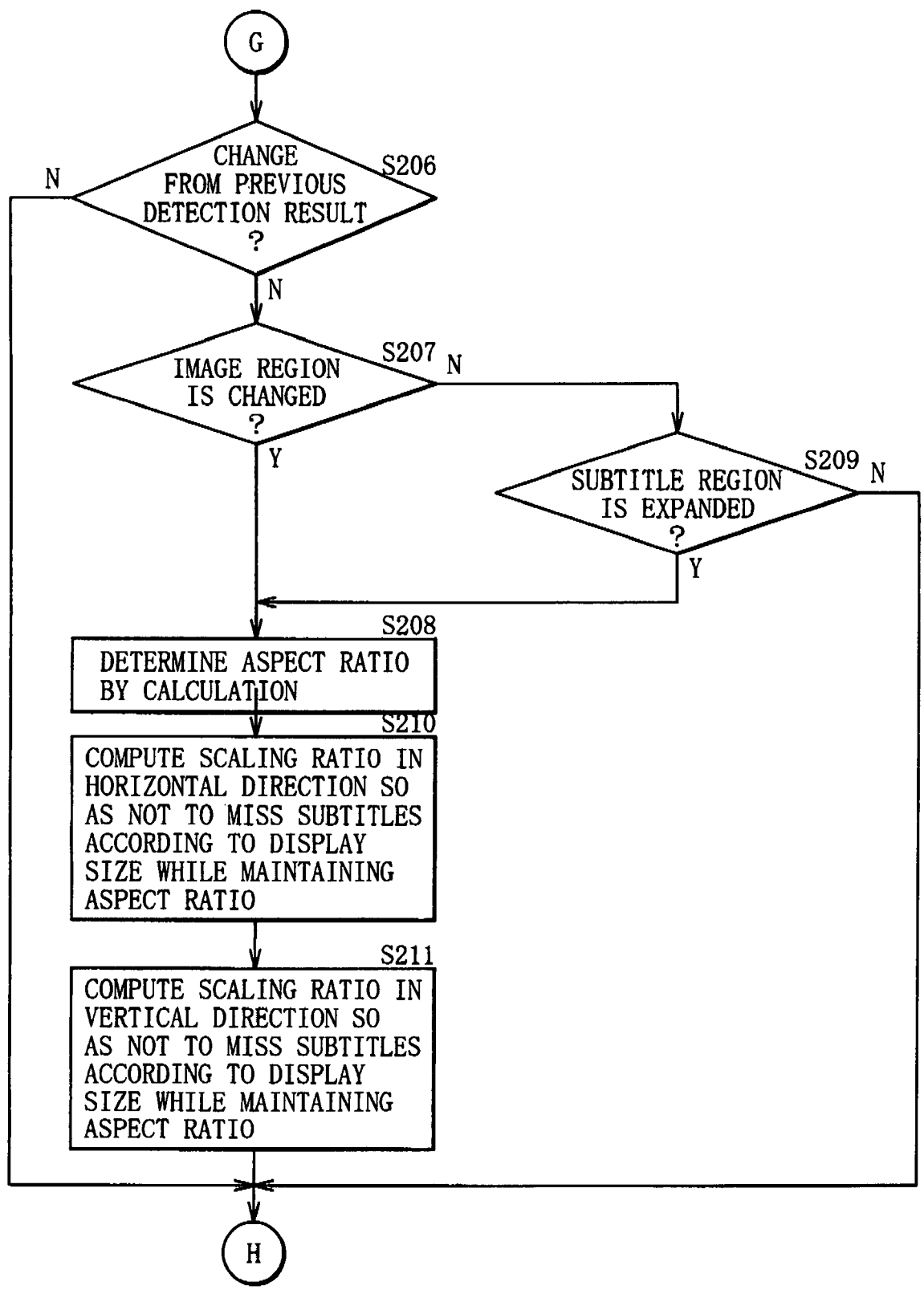
FIG. 27 is a flowchart showing the details of the scaling ratio computing process following FIG. 26.

Referring back to FIG. 24, next, the computing section 31 in the image processing section 3 performs a process (a scaling ratio computing process) of determining the expansion ratio or the reduction ratio of the YUV signals (Yin, Uin, Vin) as the input image signals by computation on the basis of the result (the black band detection result Kout) of the black band detecting process by the above-described black band detecting section 2 and the type identifying result Sout of the input image signals by the signal type identifying section 21 (step S2). More specifically processes shown in flowcharts of FIGS. 26 and 27 are performed.

Figure 28:
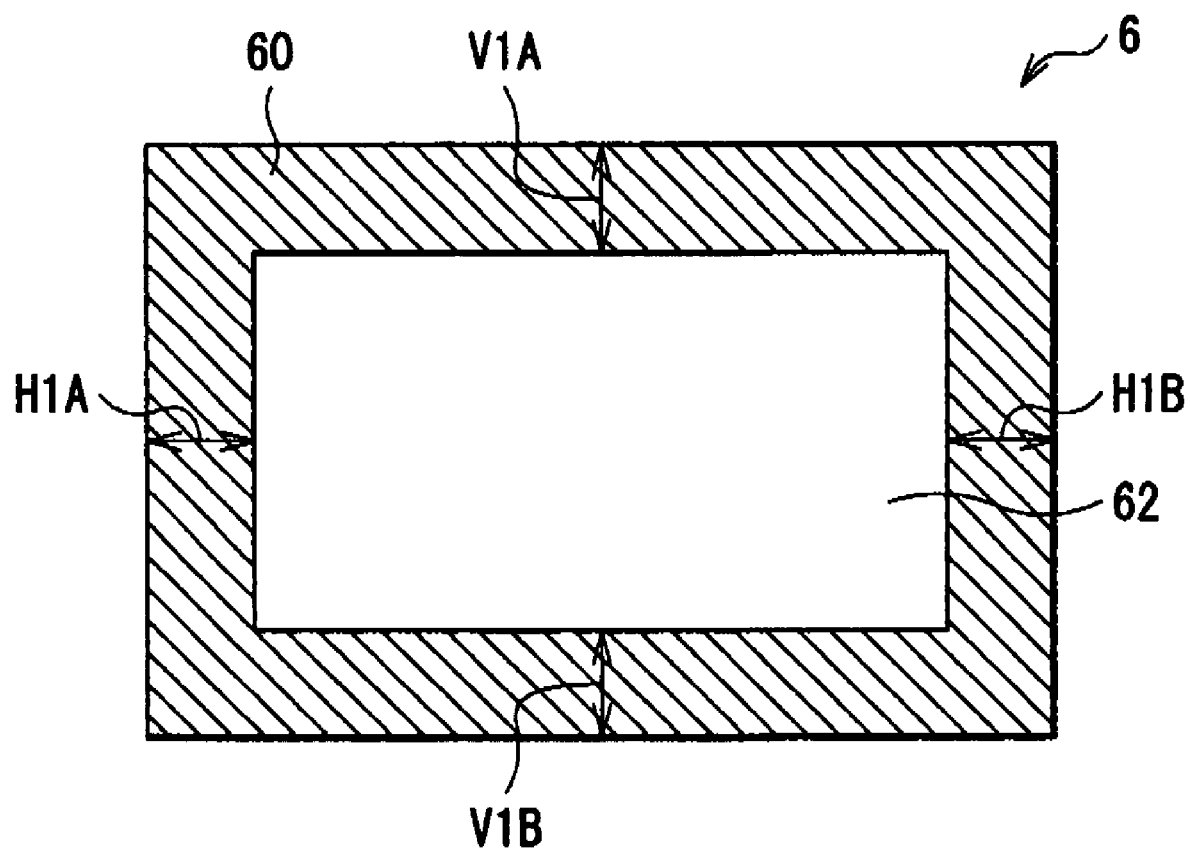
FIG. 28 is a schematic view for describing a measurement result in the case where a black band region is not present.

At first, when the computing section 31 acquires the black band detection result Kout (and the type identifying result Sout) (step S201), the computing section 31 determines whether the black band region is present in the input image signals (Yin, Uin, Vin) on the basis of the results (step S202). More specifically, whether the black band region is present is determined depending on whether the horizontal back porch length, the horizontal front porch length, the vertical back porch length and the vertical front porch length of the input image signals on the basis of the type identifying result Sout meet the horizontal back porch length H1A, the horizontal front porch length H1B, the vertical back porch length V1A and the vertical front porch length V1B on the basis of the black band detection result Kout. It is because, for example, in the case where the black band region is not present in the input image signal, for example, as shown in FIG. 28, these values on the basis of the type identifying result Sout match the value on the basis of the black band detection result Kout.

In the case where the absence of the black band region is determined in such a manner in step S202 (step S202: N), the computing section 31 computes the scaling ratios in a horizontal direction and a vertical direction according to the display size of the image region on the basis of the signal type identifying result Sout (steps S204 and S205). Then, the computing result Cout is outputted to the scaling section 32 (step S205), thereby the scaling ratio computing process is terminated.

On the other hand, in the case where the presence of the black band region is determined in step S202 (step S202: Y), the computing section 31 determines whether the current black band detection result Kout is changed from the result in the previous unit frame (whether the values of the horizontal back porch length H1A, the horizontal front porch length H1B, the vertical back porch length V1A and the vertical front porch length V1B and the like are changed) (step S206). In the case where it is determined that the current black band detection result Kout is not changed from the previous result (step S206: N), it is not necessary to change the scaling ratio, and the scaling ratio is maintained as it is, so the scaling ratio computing process is terminated.

On the other hand, in the case where it is determined in step S206 that the current black band detection result Kout is changed from the previous result (step S206: Y), the computing section 31 determines whether the image region is changed on the basis of the black band detection result Kout (for example, whether the widths H2 and V2 of the image region shown in FIGS. 12A and 12B are changed) (step S207). In the case where it is determined that the image region is not changed (step S207: N), the computing section 31 determines whether a subtitle region is expanded on the basis of the black band detection result Kout (step S209). More specifically, the computing section 31 determines whether the length V0A from the top end of the input image signal 6 to the top end of the OSD 63A or the length V0B from the bottom end of the input image signal 6 to the bottom end of the subtitle 63B as shown in FIG. 12A is reduced. In the case where it is determined that the subtitle region is reduced or not changed by these values (step S209: N), it is not necessary to change the scaling ratio, and the scaling ratio is maintained as it is, so the scaling ratio computing process is terminated.

On the other hand, in the case where it is determined in step S207 that the image region is changed (step S207: Y), and it is determined in step S209 that the subtitle region is expanded (step S209: Y), the computing section 31 determines the aspect ratio of the image region except for the black band region in the input image signals (Yin, Uin, Vin) by calculation on the basis of the black band detection result Kout (more specifically the widths H2 and V2 of the image region and the like) (step S208). Then, the computing section 31 determines the scaling ratios in a horizontal direction and a vertical direction by computation so as not to miss the subtitles according to the display size while maintaining the aspect ratio of the image region in the input image signals (Yin, Uin, Vin) on the basis of the determined aspect ratio and the black band detection result Kout (steps S210 and S211). Thereby, the scaling ratio computing process is terminated.

Figure 29A:
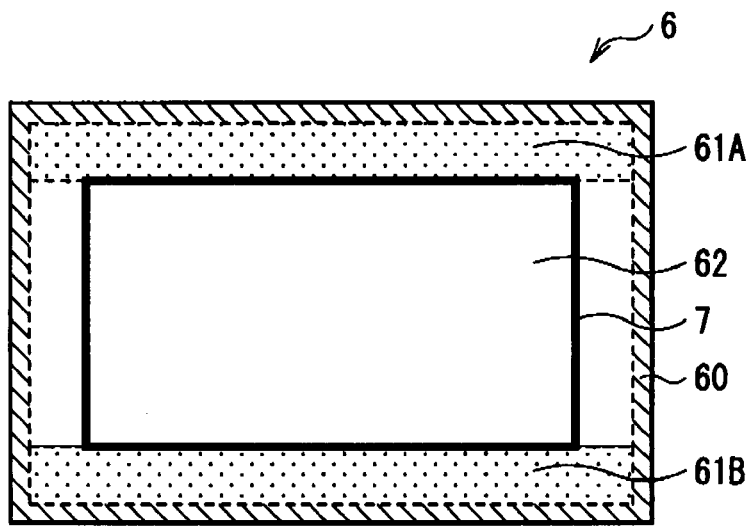
FIGS. 29A, 29B and 29C are schematic views for describing an input image signal scaling process.

More specifically, for example, as shown in FIG. 29A, in the case where the subtitles are not present in the black band regions 61A and 61B in the input image signal 6, to prevent the black band regions 61A and 61B from blocking views, while maintaining the aspect ratio of the input image signal 6, scaling (aspect ratio adjustment) is performed on the input image signal 6 so as to display only the image region 62 as a display region 7 on the whole display screen of the display section 5.

Figure 29B:
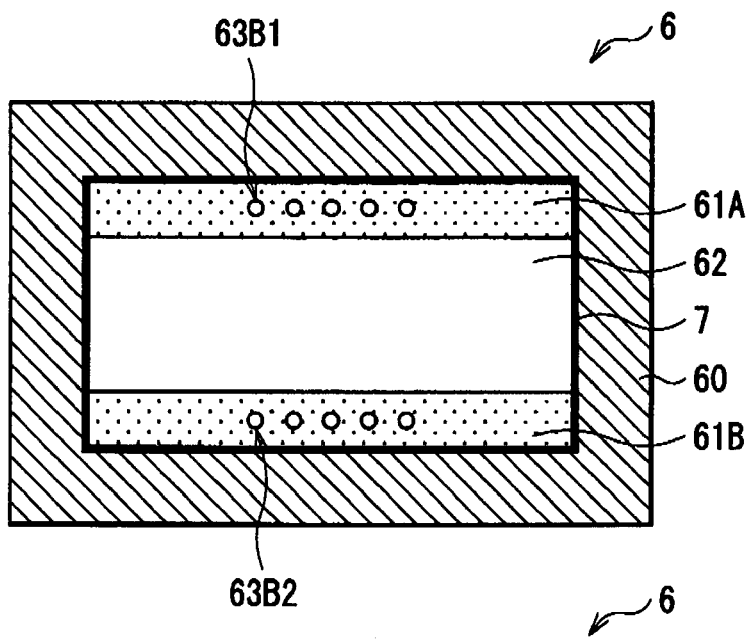
Figure 29C:
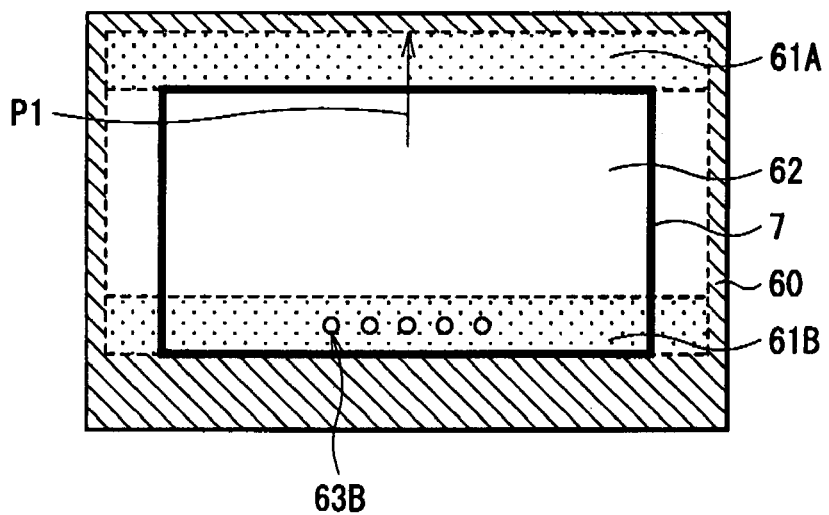

On the other hand, for example, as shown in FIG. 29B, in the case where the subtitles 63B1 and 63B2 are present in the black band regions 61A and 61B, scaling is performed so as not miss the subtitles 63B1 and 63B2 while maintaining the aspect ratio of the input image signal 6. Moreover, for example, as shown in FIG. 29C, in the case where the subtitles (the subtitles 63B) are present only either of a pair of black band regions (in this case, in the black band region 61B on a bottom side of the black band regions 61A and 61B on top and bottom sides), as shown by an arrow P1 in the drawing the position adjusting section 33 performs the position adjustment on the image signal, which is scaled so as not to miss the subtitles 63B by the scaling section 32, so as not to include the other black band region (in this case, the black band region 61A on a top side) in the display region 7.

In addition, in the case where a sub-window is arranged in a part of the display screen of the display section 5, and an image signal is displayed in the sub-window, the image processing section 3 may perform the aspect ratio adjustment process so as to display an input image signal on the whole sub-window.

Next, referring back to FIG. 24, the scaling section 32 scales the YUV signals (Yin, Uin, Vin) as the input image signals on the basis of the computing result Cout (the scaling ratio) by the computing section 31 (step S3). Next, the position adjusting section 33 performs position adjustment shown in, for example, FIG. 29C on the image signals which are scaled by the scaling section 32 so as not to miss the subtitles in the black band region (step S4). Finally, whether the aspect ratio adjustment process is terminated is determined (step S5), and in the case where it is determined that the process is not terminated (step S5: N), the processes of step S0 through S4 are repeated, and in the case where it is determined that the process is terminated (step S5: Y), the aspect ratio adjustment process is terminated.

Thus, on the basis of the black band detection result Kout by the black band detecting section 2, the image processing section 3 performs the image processing (the aspect ratio adjustment process on the input image signal).

As described above, in the embodiment, the measuring section 22 measures in the unit frame period whether each pixel in the measurement regions 64A and 64B of the YUV signals (Yin, Uin, Vin) as the input image signal 6 has a signal level less than the threshold value Vt, and the detecting section 23 detects the black band region included in the input image signal 6 on the basis of the measurement result, so compared to related arts, the black band region included in the input image signal can be detected in a shorter time.

Moreover, in the measuring section 22 and the detecting section 23, the boundary between the black band region and the image region is detected from the measurement result whether each pixel has a signal level less than the threshold value Vt, and a new measurement region is determined by adding or subtracting ½ of the previous increment/decrement value as a new increment/decrement value to or from the previous measurement range depending on whether the boundary is detected, and the new measurement region is repeatedly measured, and the black band region is detected on the basis of the measurement result, so the black band region included in the input image signal 6 can be detected in a shorter time.

Further, the detection determining section 237 in the detecting section 23 determines whether the width of the black band region is changed, and in the case where the width is changed, whether only either of the widths of two black band detection regions is largely changed is determined, so in the case where only either of them is largely changed, it can be determined that the image signal is a dark scene or the like, and false detection of the black band region can be prevented. Therefore, such false detection can be prevented, and the black band detection can be performed with high precision.

Moreover, as described above, black band detection can be performed in a short time with high precision, so the image processing section 3 can perform optimum image processing through the use of the black band detection result Kout in a short time.

Further, while the aspect ratio of the image region except for the black band region in the input image signal is maintained, the input image signal can be scaled. Therefore, when an image is displayed through the use of the scaled image signal, an easily viewable image can be displayed, compared to related arts.

The expansion or reduction of the image signal is performed in consideration of the presence or absence of the subtitles in the black band region, so without missing the subtitles, an image including the black band region can be displayed.

The display position of the image signal can be adjusted by the position adjusting section 33 depending on the presence or absence of the subtitles in the black band region. Therefore, a more easily viewable image can be provided.

Image processing is performed through the use of the black band detection result Kout detected by the black band detecting section 2 at a high speed, so the scaling ratio can be determined by calculation again according to a change in the input image signal, and the aspect ratio can be adjusted in real time.

Although the present invention is described referring to the embodiment, the invention is not limited to the embodiment, and can be variously modified.

For example, in the above-described embodiment, black band detection on the Cinemascope image signal including the black band regions above and below the image region or the side panel image signal including the black band region on the right and the left of the image region is described; however, the black band region can be detected from four directions, that is, on the top, bottom, right and left sides of the image region by the combination of such black band detection.

Moreover, in the above-described embodiment, the case where the image processing section 3 performs the aspect ratio adjustment process on the input image signal through the use of the black band detection result Kout by the black band detecting section 2 is described; however, image processing through the use of the black band detection result Kout is not limited to the case, and the image processing can be applied to, for example, a contrast adjustment process, a luminance adjustment process or the like. In the case where the image processing is applied to such image processing, optimum image processing can be performed in a short time by the black band detection performed by the black band detecting section 2 in a short time with high precision.

Moreover, in the above-described embodiment, the image display to which the YUV signals are inputted is described; however, the invention can be applied to an image display to which RGB signals are directly inputted such as a PC. In addition, in the case where the RGB signals are directly inputted in such a manner, matrix conversion is not necessary, so the matrix circuit 41 is not necessary.

Further, in the above-described embodiment, the invention is described referring the TV as a specific example of the image display; however, the image display of the invention can be applied to a PDA (Personal Digital Assistants), a cellular phone or the like.

It should be understood by those skilled in the art that various modifications, combinations, sub-combinations and alterations may occur depending on design requirements and other factors insofar as they are within the scope of the appended claims or the equivalents thereof.

The invention claimed is:

1. An image signal processing apparatus comprising:
a measuring means for measuring in a unit frame period whether each pixel in a designated measurement region of an input image signal has a signal level less than a threshold value;
a black band detecting means for detecting a black band region included in the input image signal on the basis of a measurement result from the measuring means;
a basic region providing means for providing a basic region as a basic part to be measured;
an increment/decrement value providing means for providing an increment/decrement value in the measurement region; and
a measurement region determining means for determining the measurement region on the basis of the basic region and the increment/decrement value,
wherein
the increment/decrement value providing means resets the increment/decrement value to half of the previous value,
the measurement region determining means selectively resets a new measurement region by adding or subtracting the new increment/decrement value to or from the previous measurement region depending on whether the boundary between a black band region and an image region is detected by the black band detecting means, and
the measuring means performs the measurement on a new measurement region.

2. An image signal processing apparatus comprising:
a measuring means for measuring in a unit frame period whether each pixel in a designated measurement region of an input image signal has a signal level less than a threshold value;
a black band detecting means for detecting a black band region included in the input image signal on the basis of a measurement result from the measuring means;
a basic region providing means for providing a basic region as a basic part to be measured;
an increment/decrement value providing means for providing an increment/decrement value in the measurement region; and
a measurement region determining means for determining the measurement region on the basis of the basic region and the increment/decrement value,
wherein
the measuring means concurrently measures the measurement region in two directions, that is, a horizontal direction and a vertical direction.

3. The image signal processing apparatus according to claim 2, wherein
the measurement region determining means assigns both end positions in a horizontal direction and a top end position in a vertical direction in a basic region to both end positions in a horizontal direction and a top end position in a vertical direction in the measurement region, respectively, and assigns a position determined by adding an initial increment/decrement value to the top end position in the basic region to an initial bottom end position in the measurement region, and from then on, the measurement region determining means repeatedly determines a new measurement region by adding or subtracting the increment/decrement value to or from the previous bottom end position in the measurement region, and
the black band detecting means detects a top side black band region included in the input image signal on the basis of the measurement results on the measurement regions set by the measurement region determining means.

4. The image signal processing apparatus according to claim 2, wherein the measurement region determining means assigns both end positions in a horizontal direction and a bottom end position in a vertical direction in a basic region to both end positions in a horizontal direction and a bottom end position in a vertical direction in the measurement region, respectively, and assigns a position determined by subtracting an initial increment/decrement value from the bottom end position in the basic region to an initial top end position in the measurement region, and from then on, the measurement region determining means repeatedly determines a new measurement region by adding or subtracting the increment/decrement value to or from the previous top end position in the measurement region, and the black band detecting means detects a bottom side black band region included in the input image signal on the basis of the measurement results on the measurement regions set by the measurement region determining means.

5. The image signal processing apparatus according to claim 2, wherein the measurement region determining means assigns both end positions in a vertical direction and a left end position in a horizontal direction in the basic region to both end positions in a vertical direction and a left end position in a horizontal direction in the measurement region, respectively, and assigns a position determined by adding an initial increment/decrement value to the left end position in the basic region to an initial right end position in the measurement region, and from then on, the measurement region determining means repeatedly determines a new measurement region by adding or subtracting the increment/decrement value to or from the previous right end position in the measurement region, the black band detecting means detects a left side black band region included in the input image signal on the basis of the measurement results on the measurement regions set by the measurement region determining means.

6. The image signal processing apparatus according to claim 2, wherein the measurement region determining means assigns both end positions in a vertical direction and a right end position in a horizontal direction in the basic region to a both end positions in a vertical direction and a right end position in a horizontal direction in the measurement region, respectively, and assigns a position determined by subtracting an initial increment/decrement value from the right end position in the basic region to an initial left end position in the measurement region, and from then on, the measurement region determining means repeatedly determines a new measurement region by adding or subtracting the increment/decrement value to or from the previous left end position in the measurement region, and the black band detecting means detects a right side black band region included in the input image signal on the basis of the measurement results on the measurement regions set by the measurement region determining means.

7. An image signal processing apparatus comprising:

a measuring means for measuring in a unit frame period whether each pixel in a designated measurement region of an input image signal has a signal level less than a threshold value;

a basic region providing means for providing a basic region as a basic part to be measured;

an increment/decrement value providing means for providing an increment/decrement value in the measurement region;

a measurement region determining means for determining the measurement region on the basis of the basic region and the increment/decrement value; and a black band detecting means for detecting a black band region included in the input image signal on the basis of a measurement result from the measuring means, wherein the increment/decrement value providing means resets the increment/decrement value to half of the previous value, the measurement region determining means selectively resets a new measurement region by adding or subtracting the new increment/decrement value to or from the previous measurement region depending on whether the boundary between a black band region and an image region is detected by the black band detecting means, and the measuring means performs the measurement on a new measurement region.

8. The image signal processing apparatus according to claim 7, wherein the black band detecting means detects the pixel number of pixels with a signal level less than a threshold value which continues from an end of the measurement region, and performs the detecting process along an end of the measurement region to determine the minimum value of the detected pixel number as the width of a black band region.

9. The image signal processing unit according to claim 7, wherein the measuring means concurrently measures the measurement region in two directions, that is, a horizontal direction and a vertical direction.

10. The image signal processing apparatus according to claim 7, further comprising:

an image processing means for determining a corrected region of the input image signal on the basis of a detection result from the black band detecting means, and performing predetermined image processing on an input image signal in the corrected region.

11. An image display comprising:

a measuring means for measuring in a unit frame period whether each pixel in a designated measurement region of an input image signal has a signal level less than a threshold value;

a black band detecting means for detecting a black band region included in the input image signal on the basis of a measurement result from the measuring means;

a display means for displaying an image on the basis of a detection result from the black band detecting means;

a basic region providing means for providing a basic region as a basic part to be measured;

an increment/decrement value providing means for providing an increment/decrement value in the measurement region; and a measurement region determining means for determining the measurement region on the basis of the basic region and the increment/decrement value, wherein the increment/decrement value providing means resets the previous increment/decrement value to half of the previous value, the measurement region determining means selectively resets a new measurement region by adding or subtracting the new increment/decrement value to or from the previous measurement region depending on whether the boundary between a black band region and an image region is detected by the black band detecting means, and the measuring means performs the measurement on a new measurement region.

12. An image display comprising:
a measuring means for measuring in a unit frame period whether each pixel in a designated measurement region of an input image signal has a signal level less than a threshold value;
a basic region providing means for providing a basic region as a basic part to be measured;
an increment/decrement value providing means for providing an increment/decrement value in the measurement region;
a measurement region determining means for determining the measurement region on the basis of the basic region and the increment/decrement value;
a black band detecting means for detecting a black band region included in the input image signal on the basis of a measurement result from the measuring means; and
a display means for displaying an image on the basis of a detection result from the black band detecting means,
wherein the increment/decrement value providing means resets the increment/decrement value to half of the previous value,
the measurement region determining means selectively resets a new measurement region by adding or subtracting the new increment/decrement value to or from the previous measurement region depending on whether the boundary between a black band region and an image region is detected by the black band detecting means, and
the measuring means performs the measurement on a new measurement region.

13. The image display according to claim 12, further comprising:
an image processing means for determining a corrected region of the input image signal on the basis of a detection result from the black band detecting means, and performing predetermined image processing on an input image signal in the corrected region,
wherein the display means displays an image on the basis of the input image signal after the image processing.

14. An image display method comprising:
measuring in a unit frame period whether each pixel in a designated measurement region of an input image signal has a signal level less than a threshold value;
detecting a black band region included in the input image signal on the basis of a measurement result;
displaying an image on the basis of a detection result of the black band region;
providing a basic region as a basic part to be measured;
providing an increment/decrement value in the measurement region; and
determining the measurement region on the basis of the basic region and the increment/decrement value,
wherein the increment/decrement value is reset to half of the previous value,
a new measurement region is selectively reset by adding or subtracting the new increment/decrement value to or from the previous measurement region depending on whether the boundary between a black band region and an image region is detected from the measurement result, and the measurement is performed on a new measurement region.

15. An image display method comprising:
measuring in a unit frame period whether each pixel in a designated measurement region of an input image signal has a signal level less than a threshold value;
providing a basic region as a basic part to be measured;
providing an increment/decrement value in the measurement region;
determining the measurement region on the basis of the basic region and the increment/decrement value;
detecting a black band region included in the input image signal on the basis of a measurement result; and
displaying an image on the basis of a detection result of the black band region,
wherein the increment/decrement value is reset to half of the previous value,
a new measurement region is selectively reset by adding or subtracting the new increment/decrement value to or from the previous measurement region depending on whether the boundary between a black band region and an image region is detected from the measurement result, and
the measurement is performed on a new measurement region.

16. The image display method according to claim 15, wherein
a corrected region of the input image signal is determined on the basis of a detection result of the black band region, and predetermined image processing is performed on an input image signal in the corrected region, and an image is displayed on the basis of the input image signal after the image processing.

17. An image signal processing apparatus comprising:
a measuring section measuring in a unit frame period whether each pixel in a designated measurement region of an input image signal has a signal level less than a threshold value;
a basic region providing section providing a basic region as a basic part to be measured;
an increment/decrement value providing section providing an increment/decrement value in the measurement region;
a measurement region determining section determining the measurement region on the basis of the basic region and the increment/decrement value; and
a black band detecting section detecting a black band region included in the input image signal on the basis of a measurement result from the measuring section,
wherein the increment/decrement value providing section resets the increment/decrement value to half of the previous value,
the measurement region determining section selectively resets a new measurement region by adding or subtracting the new increment/decrement value to or from the previous measurement region depending on whether the boundary between a black band region and an image region is detected by the black band detecting section, and
the measuring section performs the measurement on a new measurement region.

18. An image display comprising:
a measuring section measuring in a unit frame period whether each pixel in a designated measurement region of an input image signal has a signal level less than a threshold value;

a basic region providing section providing a basic region as a basic part to be measured;

an increment/decrement value providing section providing an increment/decrement value in the measurement region;

a measurement region determining section determining the measurement region on the basis of the basic region and the increment/decrement value;

a black band detecting section detecting a black band region included in the input image signal on the basis of a measurement result from the measuring section; and a display section displaying an image on the basis of a detection result from the black band detecting section, wherein the increment/decrement value providing section resets the increment/decrement value to half of the previous value, the measurement region determining section selectively resets a new measurement region by adding or subtracting the new increment/decrement value to or from the previous measurement region depending on whether the boundary between a black band region and an image region is detected by the black band detecting section, and the measuring section performs the measurement on a new measurement region.

* * * * *